June 8, 1965 R. H. EICHORN ETAL 3,187,651

XEROGRAPHIC REPRODUCING APPARATUS

Filed Dec. 23, 1960 24 Sheets-Sheet 1

INVENTORS.
ROGER H. EICHORN
WILLIAM G. LEWIS
BY
ATTORNEY

June 8, 1965 R. H. EICHORN ETAL 3,187,651

XEROGRAPHIC REPRODUCING APPARATUS

Filed Dec. 23, 1960 24 Sheets-Sheet 2

INVENTORS.
ROGER H. EICHORN
WILLIAM G. LEWIS

BY [signature]

ATTORNEY

June 8, 1965 R. H. EICHORN ETAL 3,187,651

XEROGRAPHIC REPRODUCING APPARATUS

Filed Dec. 23, 1960 24 Sheets-Sheet 3

INVENTORS.
ROGER H. EICHORN
WILLIAM G. LEWIS
BY [signature]
ATTORNEY

INVENTORS.
ROGER H. EICHORN
WILLIAM G. LEWIS
BY
ATTORNEY

INVENTORS.
ROGER H. EICHORN
WILLIAM G. LEWIS
BY [signature]
ATTORNEY

June 8, 1965 R. H. EICHORN ETAL 3,187,651

XEROGRAPHIC REPRODUCING APPARATUS

Filed Dec. 23, 1960

24 Sheets-Sheet 6

INVENTORS.
ROGER H. EICHORN
WILLIAM G. LEWIS

BY [signature]

ATTORNEY

INVENTORS.
ROGER H. EICHORN
WILLIAM G. LEWIS
BY [signature]
ATTORNEY

June 8, 1965 R. H. EICHORN ET AL 3,187,651

XEROGRAPHIC REPRODUCING APPARATUS

Filed Dec. 23, 1960

24 Sheets-Sheet 8

INVENTORS.
ROGER H. EICHORN
WILLIAM G. LEWIS

BY [signature]

ATTORNEY

June 8, 1965 R. H. EICHORN ETAL 3,187,651

XEROGRAPHIC REPRODUCING APPARATUS

Filed Dec. 23, 1960 24 Sheets-Sheet 9

INVENTORS.
ROGER H. EICHORN
WILLIAM G. LEWIS

BY

ATTORNEY

INVENTORS.
ROGER H. EICHORN
WILLIAM G. LEWIS
BY
ATTORNEY

June 8, 1965 R. H. EICHORN ETAL 3,187,651

XEROGRAPHIC REPRODUCING APPARATUS

Filed Dec. 23, 1960

24 Sheets-Sheet 11

INVENTORS.
ROGER H. EICHORN
WILLIAM G. LEWIS

BY Norman P. Schroder

ATTORNEY

INVENTORS.
ROGER H. EICHORN
WILLIAM G. LEWIS
BY
ATTORNEY

INVENTORS.
ROGER H. EICHORN
WILLIAM G. LEWIS
BY [signature]
ATTORNEY

INVENTORS.
ROGER H. EICHORN
WILLIAM G. LEWIS
BY
ATTORNEY

INVENTORS.
ROGER H. EICHORN
WILLIAM G. LEWIS
BY
Norman P. Schroeder
ATTORNEY

INVENTORS.
ROGER H. EICHORN
WILLIAM G. LEWIS
BY
ATTORNEY

June 8, 1965 R. H. EICHORN ETAL 3,187,651

XEROGRAPHIC REPRODUCING APPARATUS

Filed Dec. 23, 1960 24 Sheets-Sheet 17

INVENTORS.
ROGER H. EICHORN
WILLIAM G. LEWIS

BY [signature]

ATTORNEY

INVENTORS.
ROGER H. EICHORN
WILLIAM G. LEWIS
BY [signature]
ATTORNEY

June 8, 1965 R. H. EICHORN ETAL 3,187,651

XEROGRAPHIC REPRODUCING APPARATUS

Filed Dec. 23, 1960

24 Sheets-Sheet 19

INVENTORS.
ROGER H. EICHORN
WILLIAM G. LEWIS
BY
ATTORNEY

INVENTOR.
ROGER H. EICHORN
WILLIAM G. LEWIS
BY
ATTORNEY

June 8, 1965 R. H. EICHORN ETAL 3,187,651

XEROGRAPHIC REPRODUCING APPARATUS

Filed Dec. 23, 1960 24 Sheets-Sheet 21

INVENTORS.
ROGER H. EICHORN
WILLIAM G. LEWIS

BY [signature]

ATTORNEY

INVENTORS.
ROGER H. EICHORN
WILLIAM G. LEWIS
BY
ATTORNEY

INVENTORS.
ROGER H. EICHORN
WILLIAM G. LEWIS
BY [signature]
ATTORNEY

June 8, 1965 R. H. EICHORN ET AL 3,187,651

XEROGRAPHIC REPRODUCING APPARATUS

Filed Dec. 23, 1960 24 Sheets-Sheet 24

INVENTORS.
ROGER H. EICHORN
WILLIAM G. LEWIS
BY [signature]
ATTORNEY 3,187,651
XEROGRAPHIC REPRODUCING APPARATUS
Roger H. Eichorn, Webster, and William G. Lewis, Rochester, N.Y., assignors to Xerox Corporation, a corporation of New York
Filed Dec. 23, 1960, Ser. No. 77,954
7 Claims. (Cl. 95—1.7)

This invention relates in general to xerography and, in particular, to an improved xerographic reproducing apparatus.

More specifically, the invention relates to improved automatic xerographic apparatus for use in producing xerographic reproductions from a moving original.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electrostatic powder, hereinafter referred to as toner, and a granular carrier material, which later functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into contact with the coating and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem, and, for the most part, has been limited to the particular use intended.

It is, therefore, the principal object of this invention to improve xerographic reproducing apparatus for general copying applications of the type normally encountered in business, engineering or law offices, the xerographic apparatus being capable of making copies quickly, automatically, economically and accurately.

Another object of this invention is to improve upon xerographic apparatus so that reproductions of a moving copy or document can be made automatically.

A further object of this invention is to improve xerographic reproducing apparatus so that a reproduction or reproductions of a single copy can be made automatically, or successive reproductions of successive copies can be made automatically.

For a better understanding of the invention as well as other objects and further features thereof, reference is had to the following detailed description of the invention to be read in connection with the accompanying drawings, wherein.

Figures 12, 27:
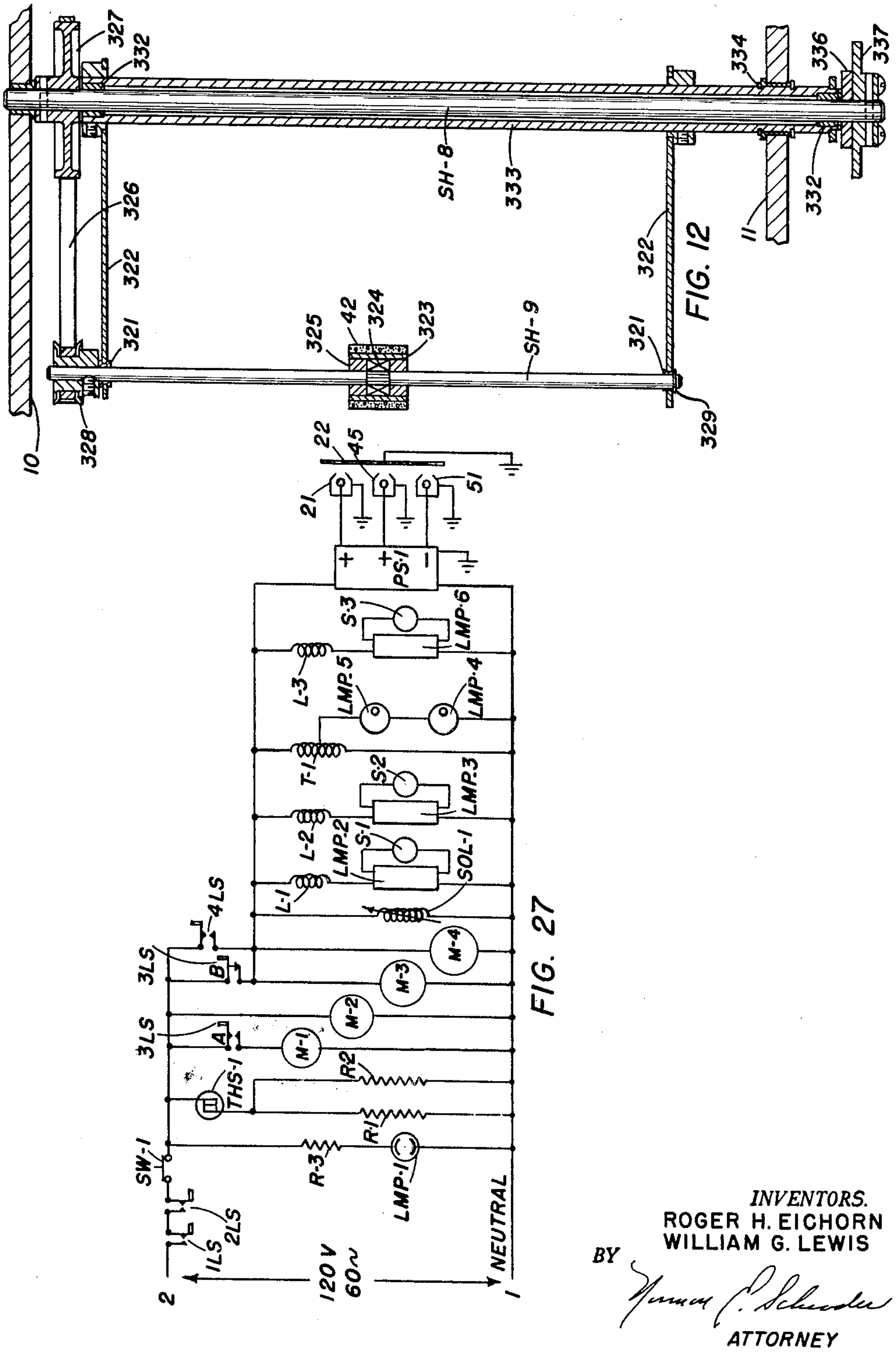
FIG. 12 is a sectional enlarged view of the paper separator mechanism.
Figures 28, 34, 35:
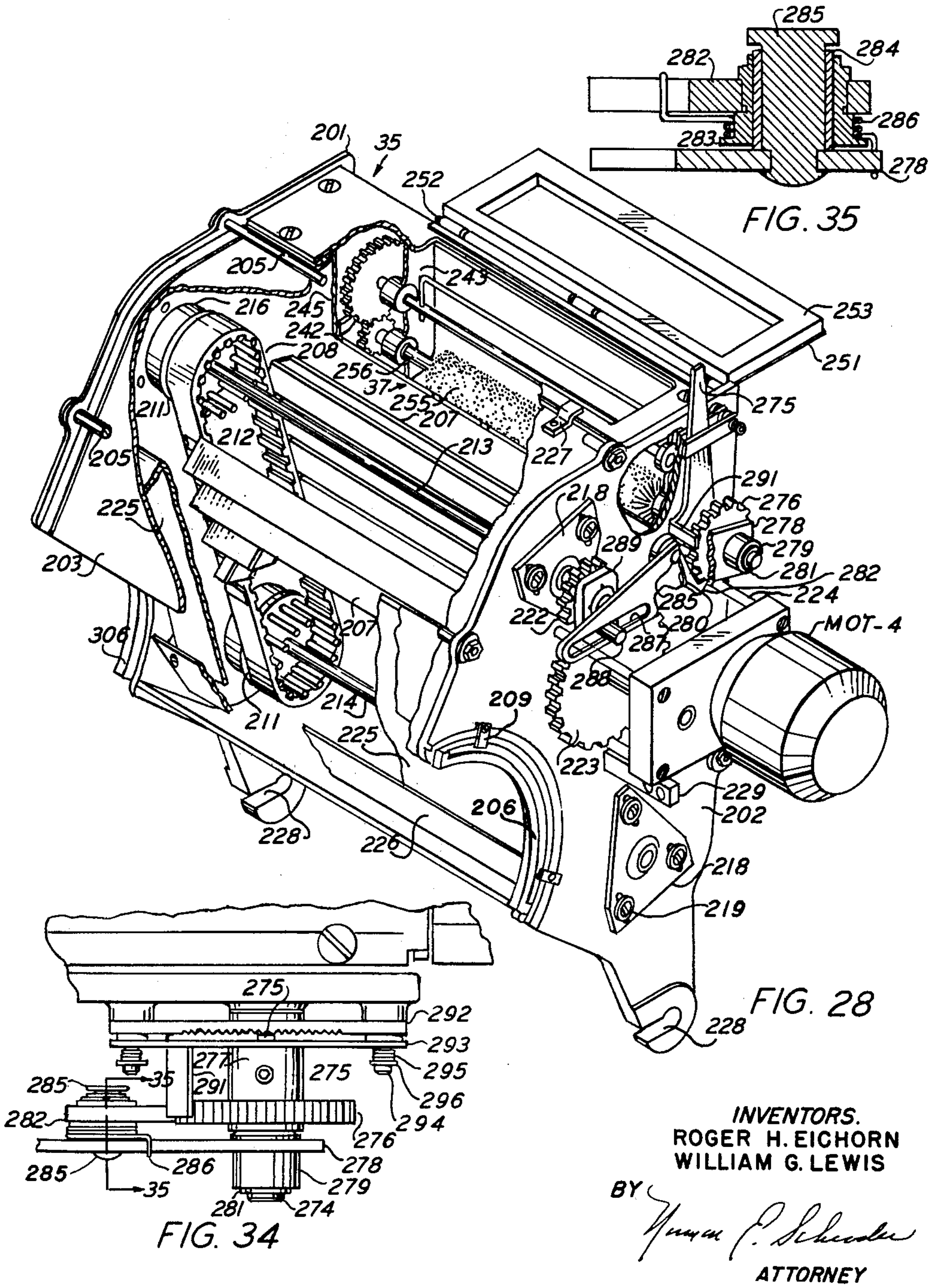
Figure 29:
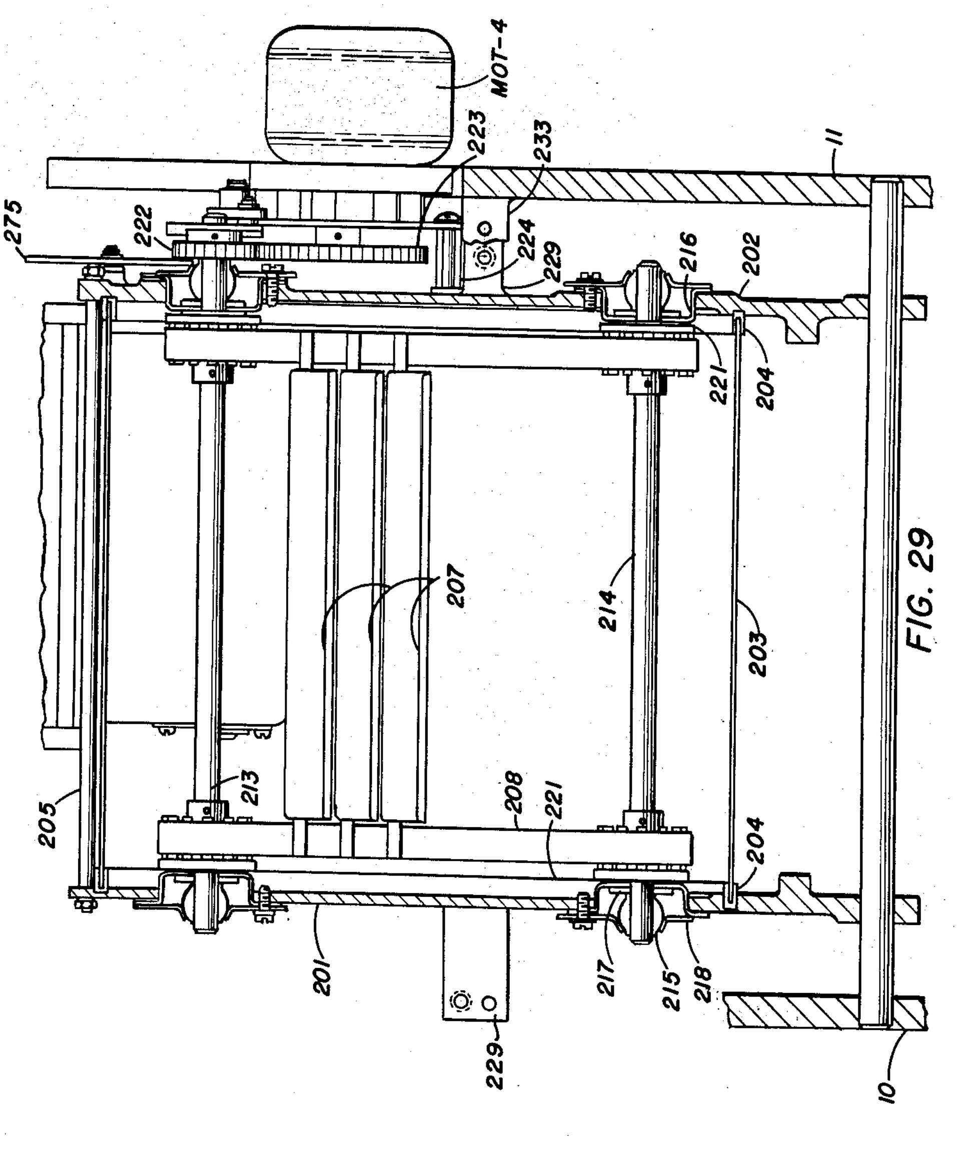
Figure 33:
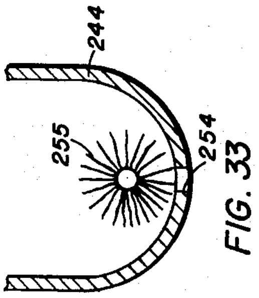
Figure 31:
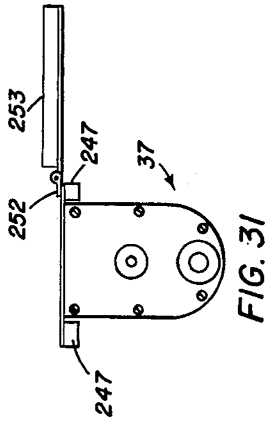
Figure 30:
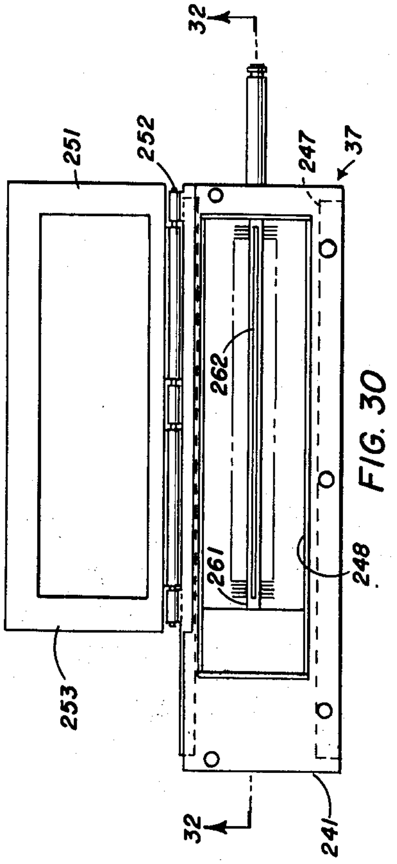
Figure 32:
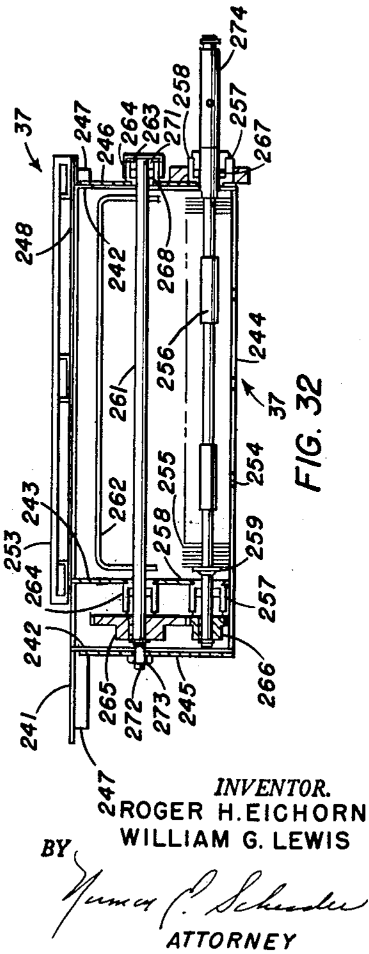
Figures 36, 37:
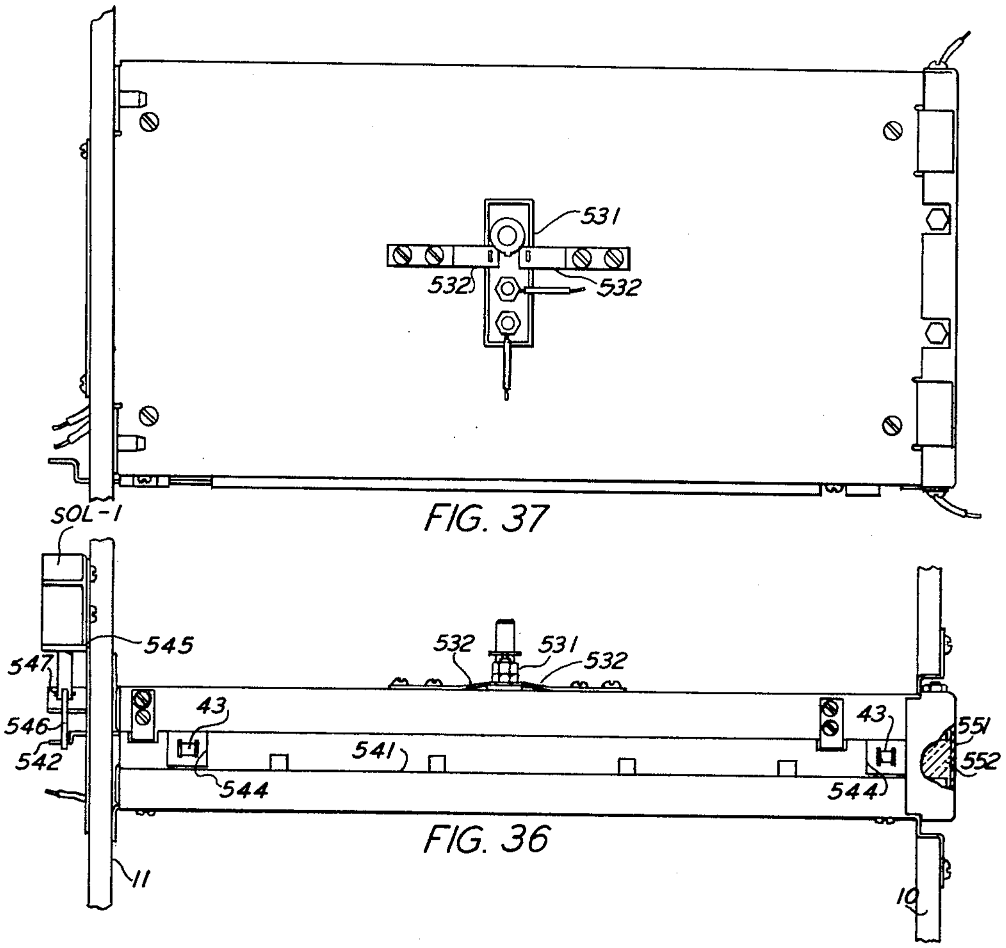
Figure 38:
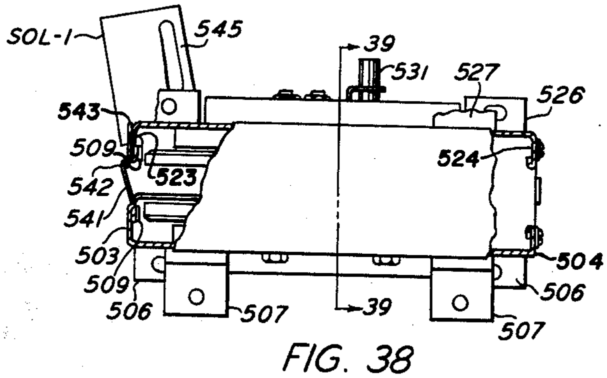
Figure 39:
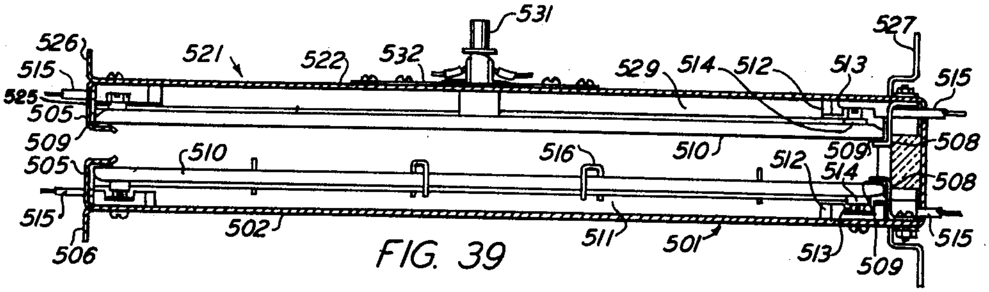
Figure 40:
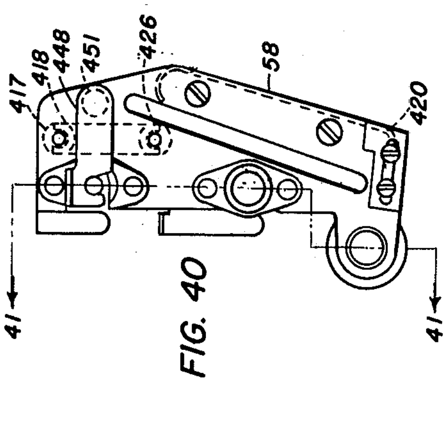
Figure 41:
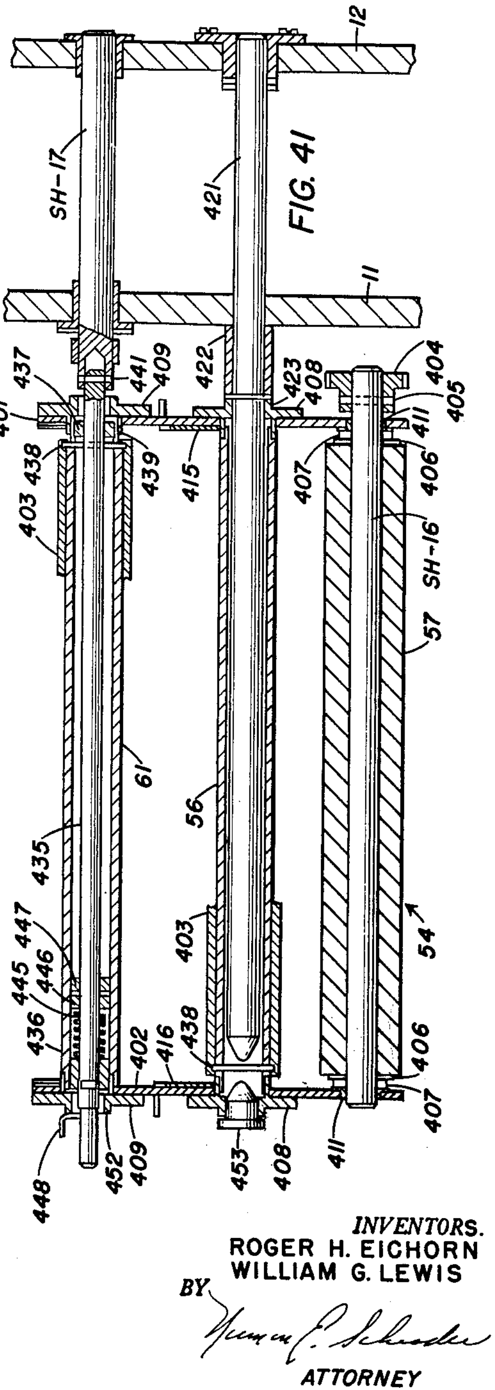
Figure 42:
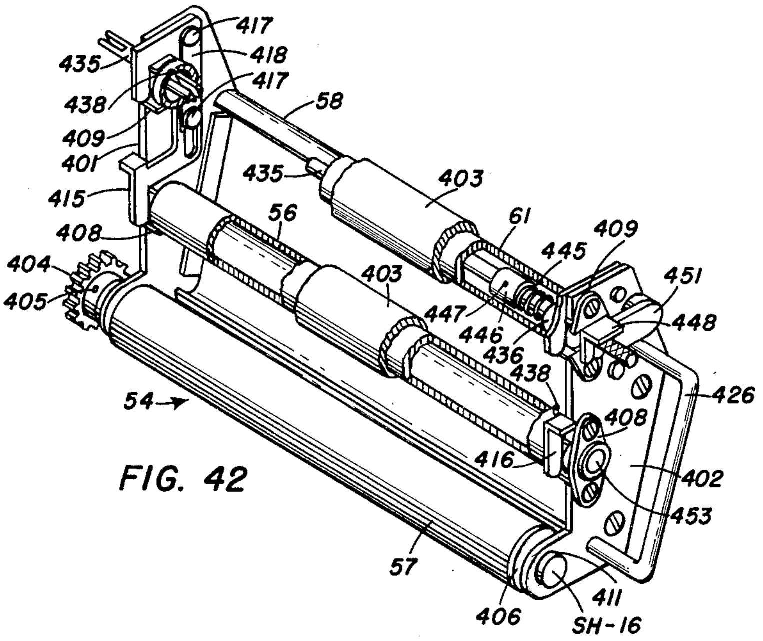
Figure 43:
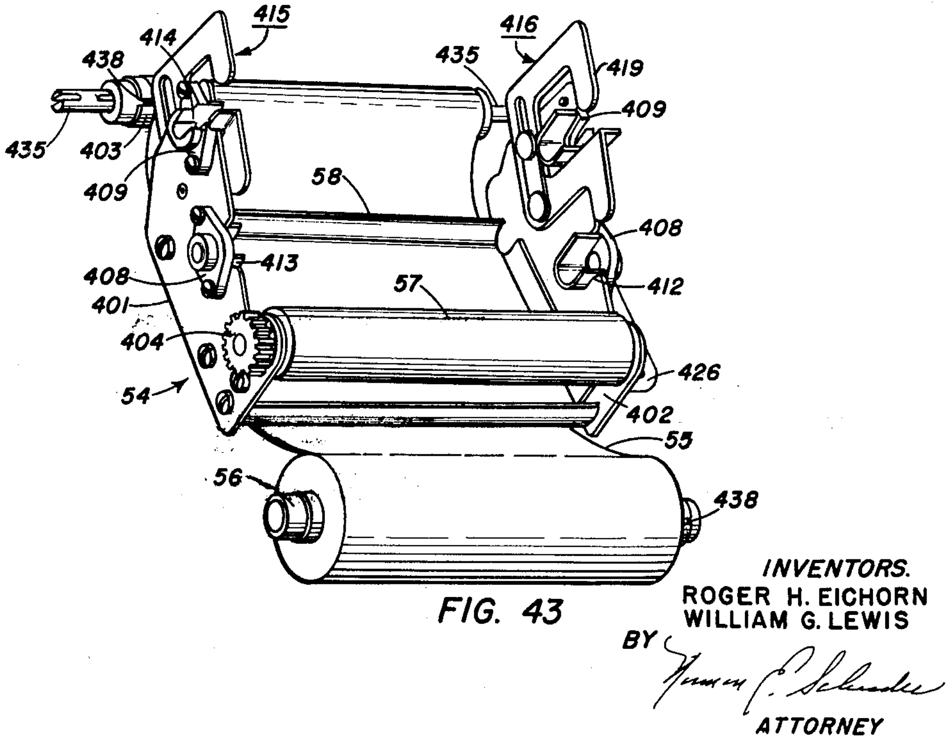

FIGS. 23, 24, 25, and 26 are schematic illustrations of the control mechanism of the invention showing the sequence of operation of these elements; and, FIG. 27 is a schematic electrical circuit wiring diagram of the apparatus;

FIG. 28 is a perspective view of the developing apparatus removed from the machine to show the details of its construction;

FIG. 29 is a sectional view of the developing apparatus;

FIG. 30 is a top view of a preferred form of toner dispenser for use in the developing apparatus, but removed from the apparatus to show details of its construction;

FIG. 31 is an end view of the toner dispenser;

FIG. 32 is a sectional view of the toner dispenser taken along line 32—32 of FIG. 30;

FIG. 33 is an enlarged sectional view showing the details of the toner outlet of the dispenser;

FIG. 34 is a top enlarged view of the dispenser drive mechanism;

FIG. 35 is an enlarged sectional view taken along line 35—35 of FIG. 34;

FIG. 36 is a side view of the heat fuser used in the apparatus;

FIG. 37 is a top view of the heat fuser apparatus;

FIG. 38 is an end view of the heat fuser;

FIG. 39 is a sectional view of the heat fuser taken along line 39—39 of FIG. 38;

FIG. 40 is a side view of a preferred embodiment of a web cleaner apparatus;

FIG. 41 is a sectional view of the web cleaner apparatus taken along line 41—41 of FIG. 40;

FIG. 42 is a left-hand perspective view of the web cleaner apparatus removed from the machine; and FIG. 43 is a right-hand perspective view of the web cleaner apparatus with the supply roll and take-up rolls removed from the assembly.

Figure 1:
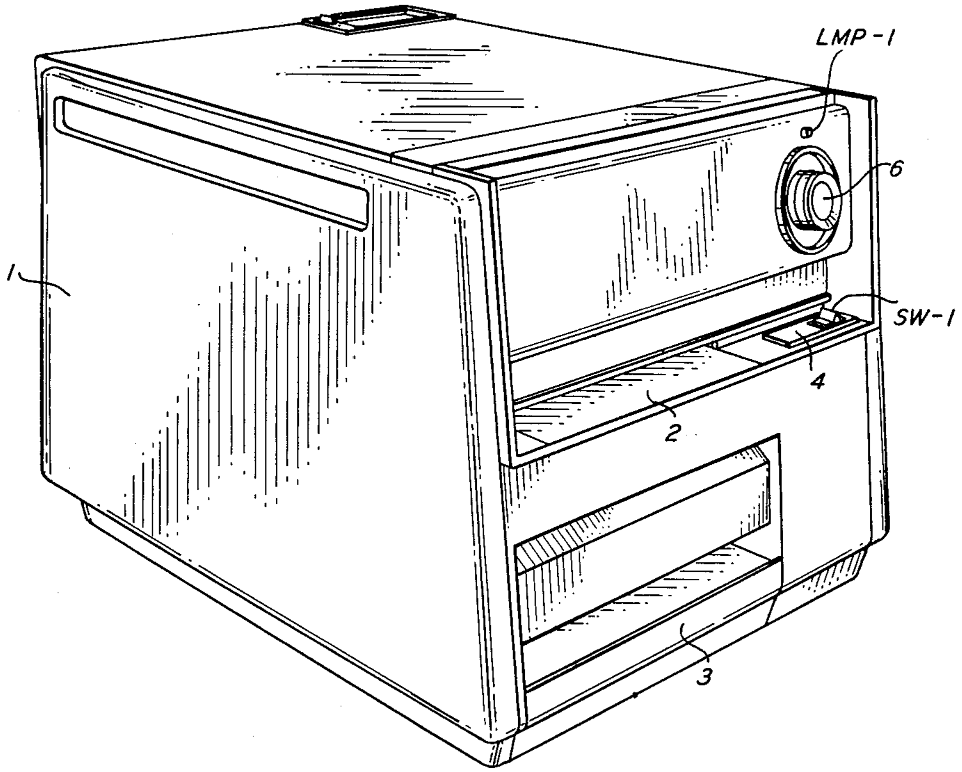
FIG. 1 is a left-hand perspective view of the apparatus of the invention.

Referring now to the drawings, there is shown in FIG. 1 a xerographic reproducing apparatus used for producing xerographic reproductions from a moving original.

The xerographic reproducing apparatus is adapted for installation within a suitable light-tight housing or cabinet of a size so that the entire unit may be mounted on an office desk or table.

*General*

As shown, the xerographic apparatus comprises a xerographic plate including a photoconductive layer or light-receiving surface on a conductive backing and formed in the shape of a drum, generally designated by numeral 20, which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is first charged and then brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A in the schematic illustration of the apparatus. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a suitable original.

The optical scanning or projection assembly consists of a copyboard in the shape of a drum, hereinafter referred to as copy drum 22, which is adapted to support copy to be reproduced and arranged to rotate in light-projection relation to the moving light-receiving surface of the xerographic plate. Uniform lighting is provided by suitable lamps attached to a slotted light reflector 23 mounted adjacent to the copy drum.

A light shield 24 adapted to protect the xerographic plate from extraneous light is positioned adjacent to the surface of the xerographic plate. A slot aperture 25 in the light shield extends transversely to the path of movement of the light-receiving surface of the xerographic drum 20 to permit reflected rays from the copy drum to be directed against a limited transverse area of the light-receiving surface as it passes therebeneath.

To enable the optical system to be enclosed within a relatively small cabinet, a folded optical system including an object mirror 26, a lens 27, and an image mirror 28 is used in the preferred embodiment of the apparatus.

Copy fed through paper guides 31 to the copy drum is removably secured thereon by a suitable gripper mechanism for movement therewith in timed relation to the movement of the xerographic drum whereby a flowing image of the copy is projected onto the xerographic drum. The copy is held against the surface of the copy drum by means of guides 32 and 33, the latter also preventing the trailing edge of the copy from contacting the web cleaner 54. After the copy is scanned it can be released from the copy drum to be transported out of the machine by copy feed out roller 34 coacting with the peripheral surface of the copy drum to forward the copy through copy guide 30.

Adjacent to the exposure station is a developing station C in which there is positioned a developer apparatus 35 including a developer housing having a lower or sump portion for accumulating developer material 36. Mounted within the developer housing is a motor driven bucket-type conveyor used to carry the developer material previously supplied to the developer housing to the upper portion of the developer housing from where the developer material is cascaded over a hopper chute onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 37 mounted within the developer housing.

Positioned next adjacent to the developing station is the image transfer station D which includes suitable sheet feeding mechanism adapted to feed sheets of paper successively to the xerographic drum in coordination with the presentation of the developed image on the drum at the transfer station. The sheet feeding mechanism includes a sheet source such as tray 41 for a plurality of sheets of a suitable support material, that is, sheets of paper or the like, a separate roller 42 adapted to feed the top sheet of the stack of support material to a sheet conveyor mechanism 43 having paper grippers 44 thereon which carry the sheet support material into contact with the rotating xerographic drum in coordination with the appearance of a developed image at the transfer station.

The transfer of the xerographic powder image from the drum surface to the support material is effected by means of a corona transfer device 45 that is located at or immediately after the point of contact between the support material and the rotating xerographic drum. The corona transfer device 45 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the transfer material electrostatically to the drum surface and simultaneously with the tacking action, the electrostatic field is effective to attract the toner particles comprising the xerographic powder image from the drum surface and cause them to adhere electrostatically to the surface of the support material.

As the paper mechanism continues to move forward in its closed circuit, it will strip the support material from the xerographic drum and carry it to a fixing device, such as, for example, heat fuser 46, whereat the developed and transferred xerographic powder image on the support material is permanently fixed thereto.

After fusing, the finished copy is preferably discharged from the apparatus at a suitable point for collection externally of the apparatus. To accomplish this there is provided a pair of delivery rolls 47 and 48 by means of which the copy is delivered to a copy holder after it is released by the gripper mechanism. Suitable cam means are provided at the receiving and delivery stations of the conveyor mechanism to actuate the paper gripper at these stations to receive or discharge a sheet of support material.

The next and final station in the device is a drum cleaning station E whereat any powder remaining on the xerographic drum after the transfer step is removed and whereat the xerographic drum is flooded with light to cause dissipation of any residual electrical charge remaining on the xerographic drum.

To aid in the removal of any residual powder remaining on the xerographic drum there is provided a corona precleaning device 51 that is substantially similar to the corona discharge device that is employed at charging station A. Removal of residual powder from the xerographic drum is effected by means of a web cleaner device 54 adapted to continuously feed a clean fibrous web material into wiping contact with the xerographic drum. As shown, the web material 55 is taken from a supply roll 56 and transported around a cleaning roll 57, preferably made of rubber, around a guide plate 58 to be wound on a take-up or rewind roll 61.

Any residual electrical charge remaining on the xerographic drum is dissipated by light from a fluorescent lamp 62 mounted in a suitable bracket above the xerographic drum, a suitable starter being provided for energizing the fluorescent lamp.

Suitable drive means drive the xerographic drum, the copy drum, the sheet conveyor mechanism at predetermined speeds relative to each other, and to effect operation of the paper separator roll, and the web cleaner mechanism, the latter being driven at a speed whereby relative movement between the xerographic drum and the web material is effected. Suitable drive means are also provided for effecting operation of the conveyor mechanism and toner dispenser of the developing apparatus assembly.

Referring now to the figures, there is provided a frame for supporting the components of the apparatus formed by left-hand plate 10, intermediate plate 11 and right-hand plate 12 connected together and maintained rigidly in spaced relation to each other by suitable tie rods 13 and 14.

Figure 7:
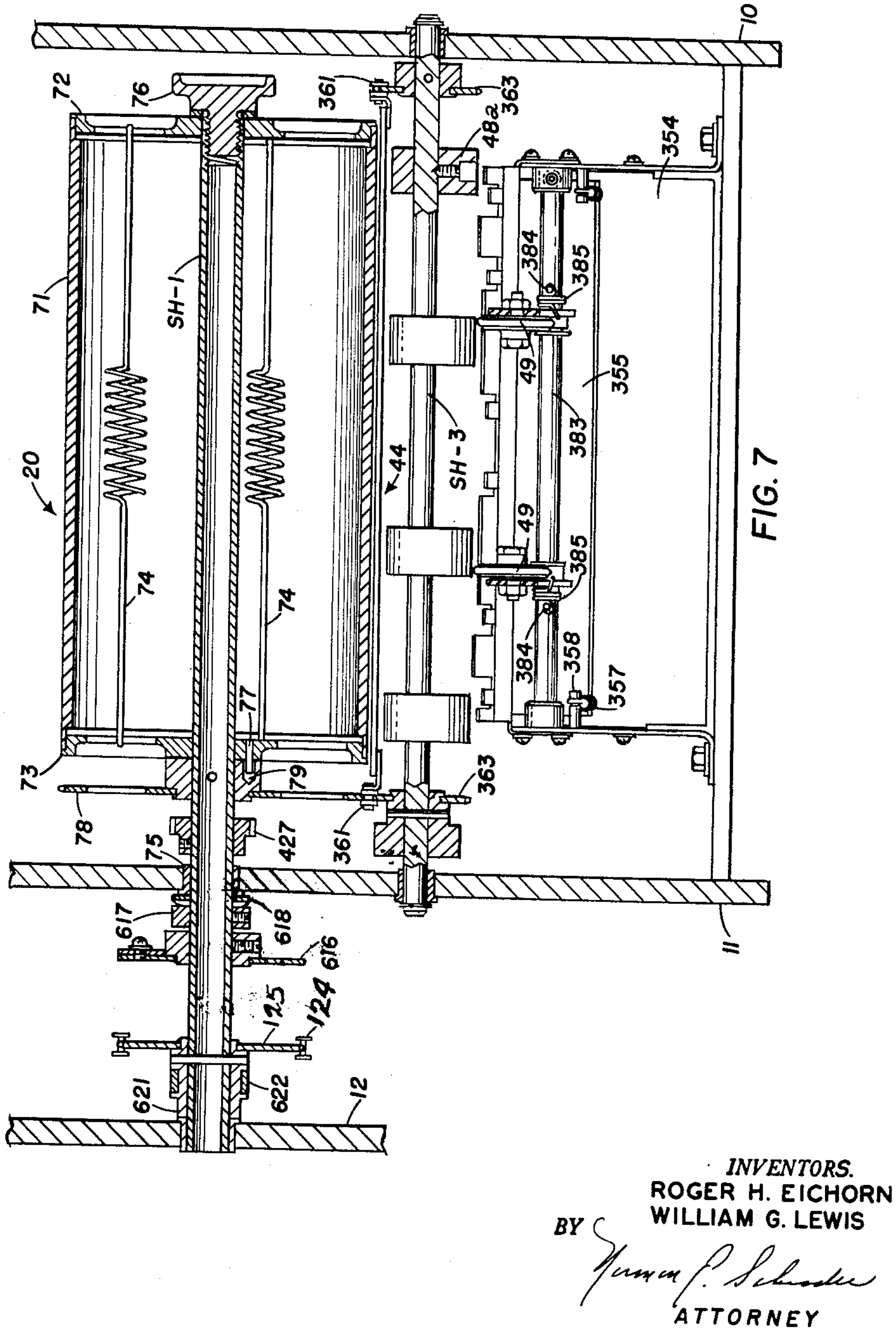
FIG. 7 is a sectional view taken along lines 7—7 of FIG. 5.
Figure 8:
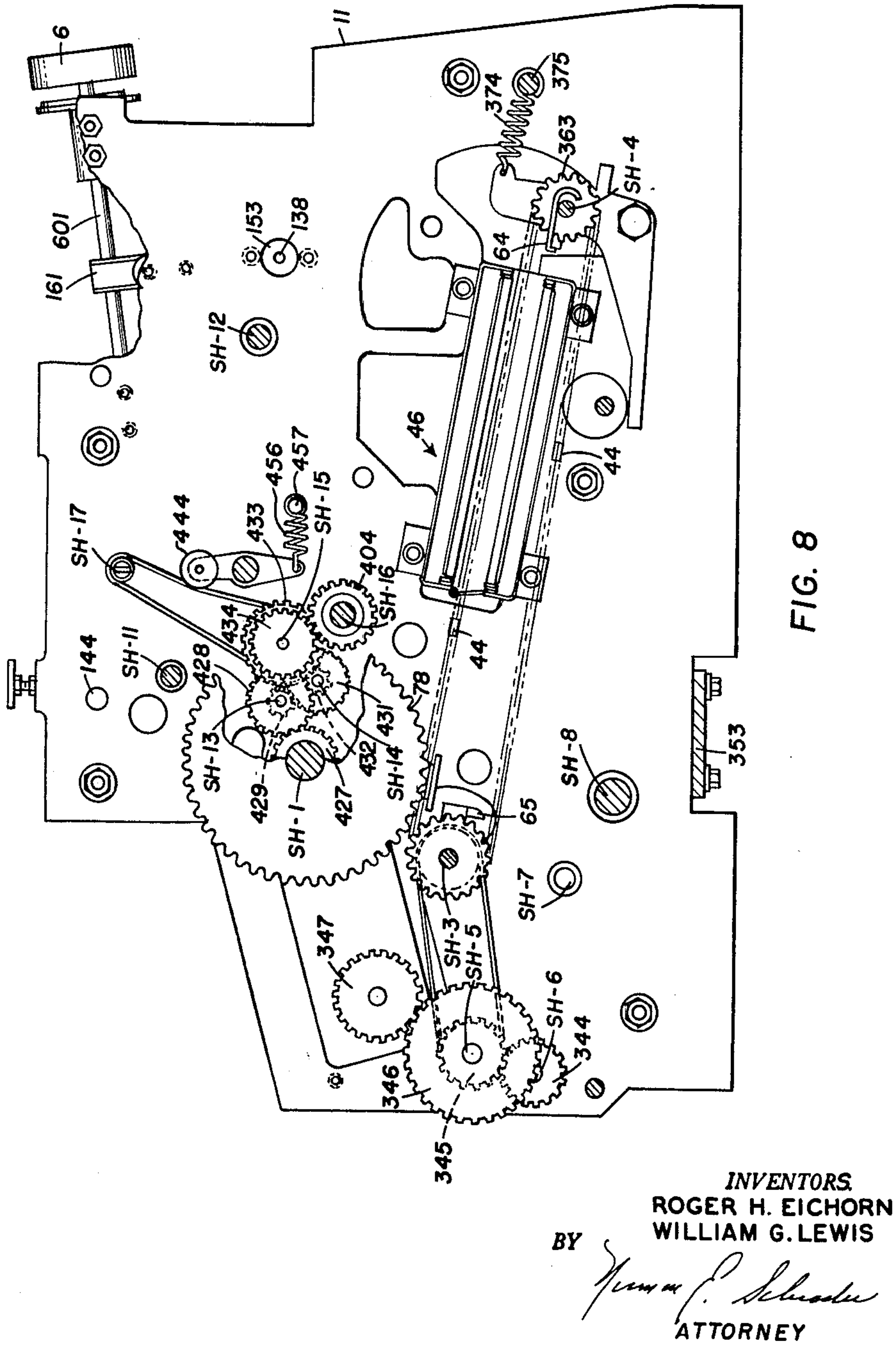
FIG. 8 is a sectional view taken along lines 8—8 of FIG. 4.

The xerographic drum 20, which includes a cylinder 71, having a layer of photoconductive insulating material on a conductive back, supported by drum hubs 72 and 73 biased toward each other by springs 74, is mounted on horizontal driven shaft SH–1 that rotates in bearings 75 mounted in plates 11 and 12. The free end or right-hand end of shaft SH–1, as seen in FIG. 7, is threaded to receive thumb nut 76 by means of which the pin 77 on hub 73 is held in driving engagement with the hub portion of the sprocket 78, the hub portion being provided with an aperture 79 to receive the pin.

*Corona generating devices*

Although any suitable means may be used to generate an electrostatic charge, in general, the electrostatic charging of the xerographic drum in preparation for the exposure step, the electrostatic charging of the support surface to effect transfer and the charging of powder to aid in effecting removal of residual toner particles from the drum surface are accomplished by means of corona generating devices whereby an electrostatic charge is applied to the respective surface, in each instance. The charge applied to effect transfer and the pre-cleaning charge are usually of a polarity opposite to the polarity of the charge applied to the drum to prepare it for the exposure step.

Although any one of a number of types of corona generating devices may be used, a corona generating device of the type disclosed in Vyverberg Patent 2,836,725, is used in each instance for the corona charging device 21, the corona transfer device 45, and the corona pre-cleaning device 51, each being secured to suitable support elements and connected to a suitable source of electrical power as shown in FIG. 27.

*Exposure mechanism*

The exposure mechanism of the xerographic reproducing apparatus of this invention is designed to use an optical projection or scanning mechanism adapted to scan a copy or document wrapped around a rotating copy drum and to project a flowing image of the copy or document onto the photoconductive surface of a rotating drum.

As shown, the scanning mechanism includes a feeding station, a copying station, an exposure station, and means for moving the document through the copying station in synchronism with the movement of the xerographic drum.

The feeding station includes a guide 31, which is mounted between plates 10 and 11, through which a document or copy is moved forward into engagement with copy drum 22 and the document stops 101 of copy guide 32, the latter orientating and holding the copy in position to be gripped by the gripper fingers of the copy drum.

Figure 5:
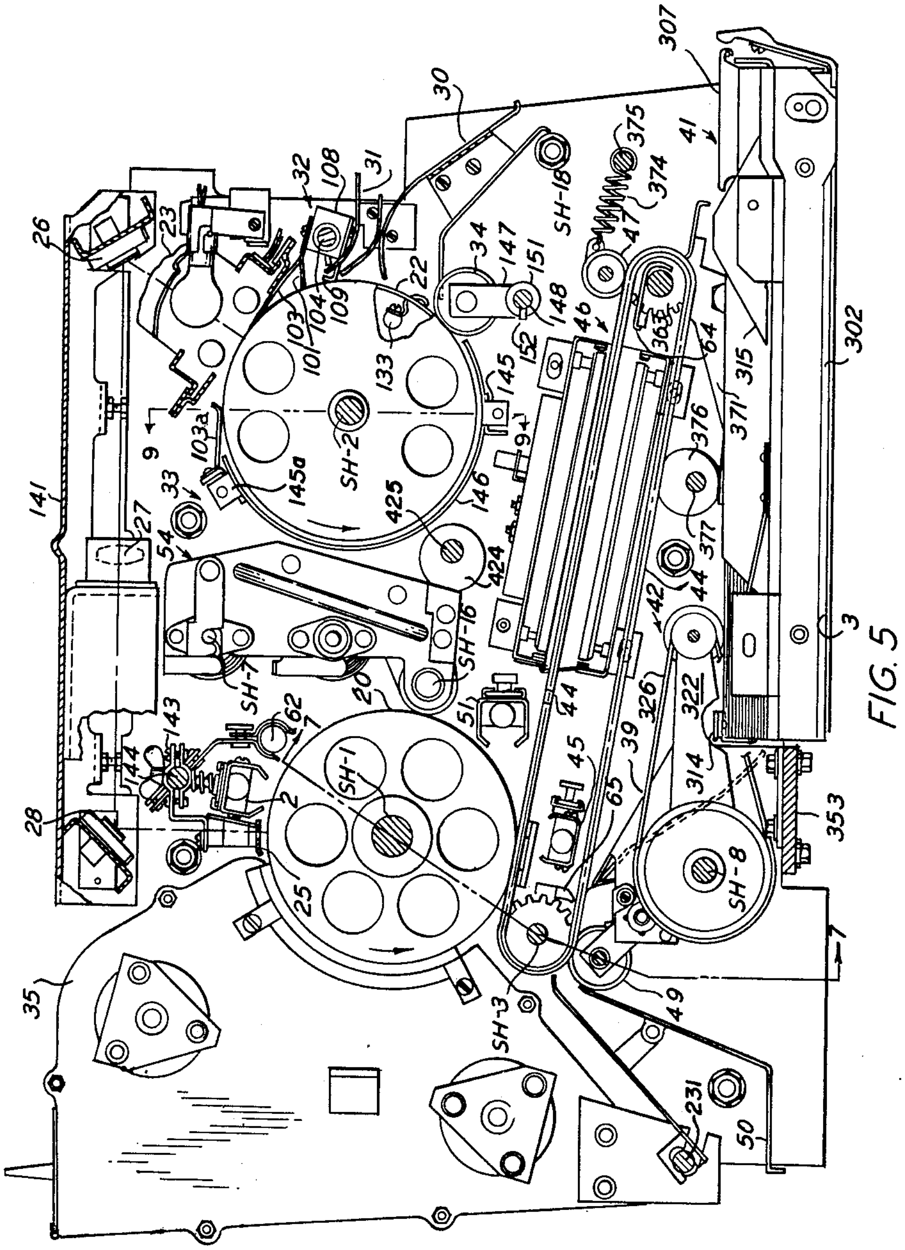
FIG. 5 is a left-hand side view of the apparatus with the left-hand frame plate removed.

Copy guide 32 includes document stops 101, actuator 102, retaining clips 109, and guides 103 carried by rod 104 journaled in bearings 105 positioned in plates 10 and 11 is held axially in alignment by means of retaining rings 106 positioned in suitable grooves formed in the rod adjacent the bearings. The rod is normally biased in a counter-clockwise direction, as seen in FIG. 5 for reasons described in detail hereinafter, by a spring 113 connected at one end to pin 111 extending radially from the rod and at its other end to a second pin 111 extending from plate 10.

Copy inserted through guide 31 by an operator is forced into contact with the copy drum 22 by the guides or retaining clips 109 and its forward progress is arrested by document stops 101 which also serve to align the leading edge of the document in parallel relationship to the axis of the copy drum.

In the embodiment shown two document stops are used, each of which is secured to a hub block 108, with a guide 103 superimposed thereover, by means of a screw 107. Each hub block 108 is loosely journaled on the rod and positioned axially thereon by means of retaining rings 106 retained in suitable grooves formed in the rod. The hub blocks 108 carrying the document stops 101 and guides 103 are each normally biased in a counter-clockwise direction, as seen in FIG. 5, around the rod by torsion springs 112, each spring being connected at one end to a pin 111 extending from a hub block 108 and at its other end to a pin 111 extending radially from the rod. The pins 111 are positioned in interfering relationship with each other to limit the arc of travel of the hub blocks around the rod.

The document stops 101 normally biased, as previously described, into contact with the copy drum to retain and align each document prior to engagement by the copy drum are disengaged by means of the actuator 102 secured to the rod in a manner described hereinafter, to release the documents to the copy drum.

The retaining clips 109 are also mounted on hub blocks 108a loosely journaled on the rod in an off-center position so that the blocks will rotate by their own weight to force the clips into contact with the copy drum or on a document sandwiched therebetween with sufficient force to hold a document against the copy drum while still permitting a document to be inserted between the copy drum and the retaining clips as a copy is forwarded therebetween.

The copy drum 22 includes a cylindrical wall portion 115 secured as by welding to end plates 116 and 116a, the latter carrying a hub 117 by means of which the drum is secured to shaft SH–2. Shaft SH–2 is supported by flanged bearings 118 positioned in plates 10 and 11, and held in axial alignment by means of retaining rings 121 positioned in suitable grooves provided in the shaft, thrust bearings 122 and 123 being provided between the flanged bearings and the retaining rings.

The copy drum is driven in timed relation with the xerographic drum by means of chain 124 which runs on sprockets 125 and 126, fixedly mounted on shafts SH–1 and SH–2, respectively, an idler sprocket 127 being movably secured to plate 12 to permit adjusting the tension on chain 124.

Figure 6:
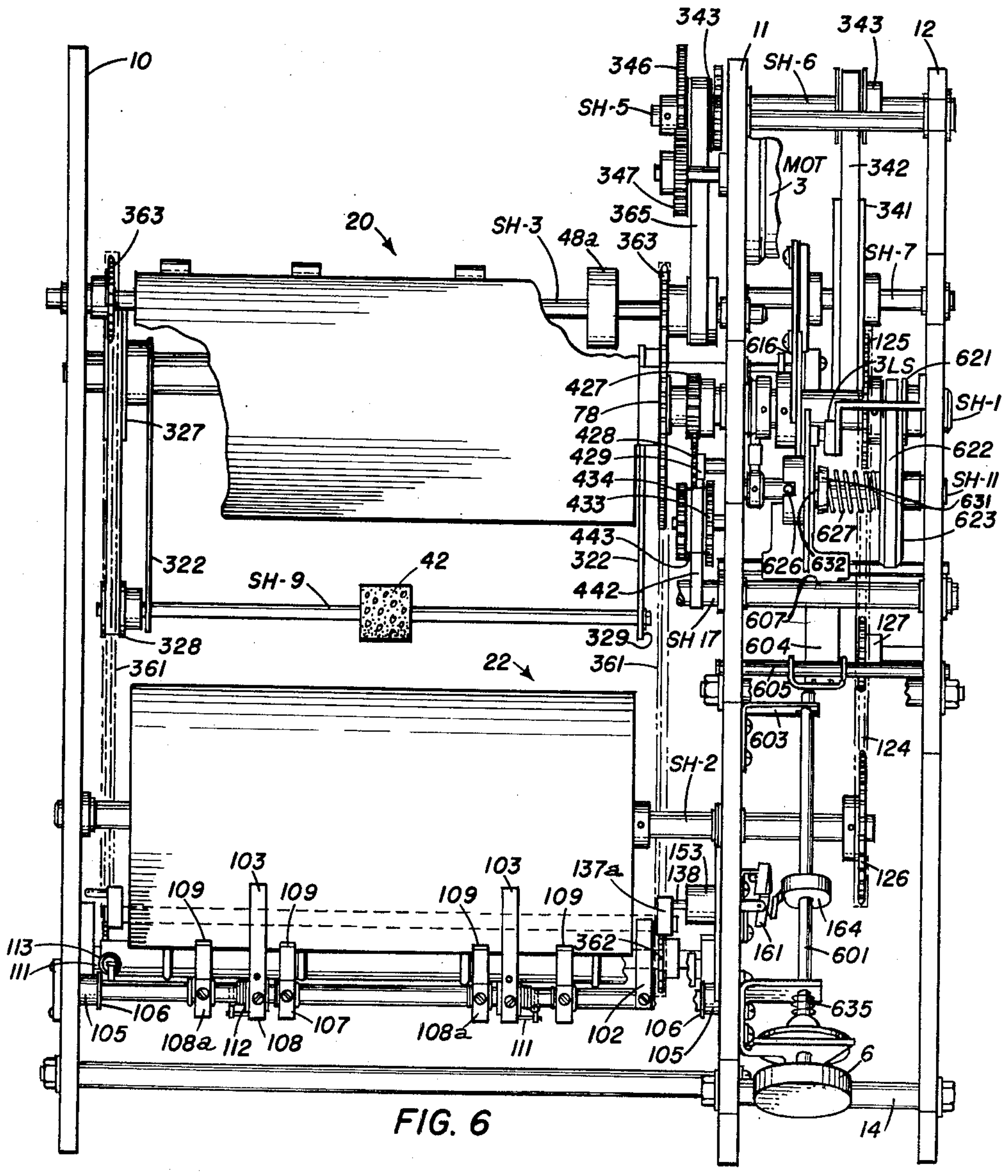
FIG. 6 is a top view of the apparatus similar to FIG. 4, but with the optical mechanism web cleaner device, corona precleaning device and the developer mechanism removed.
Figure 9:
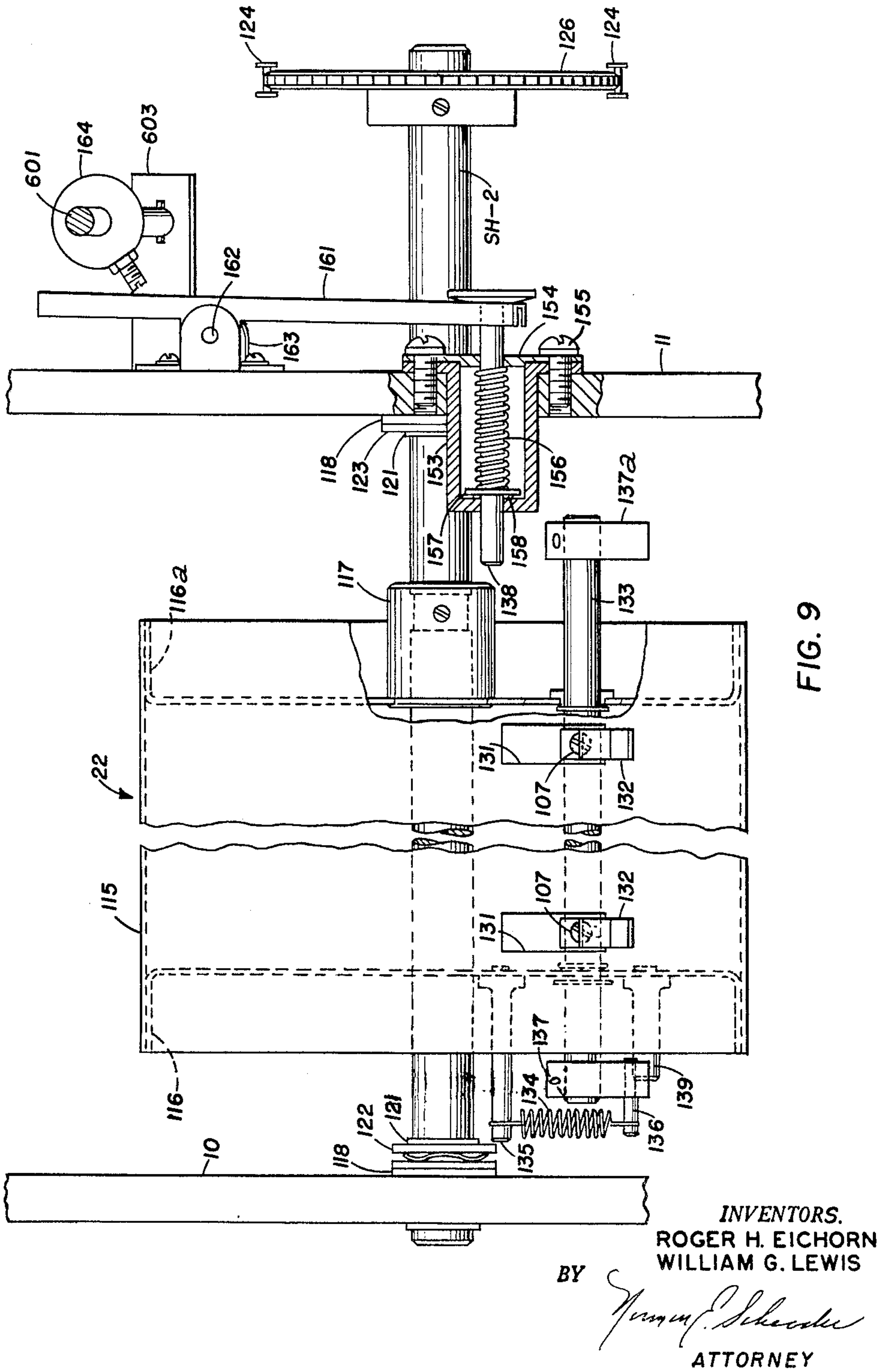
FIG. 9 is a sectional view taken along lines 9—9 of FIG. 5.
Figure 10:
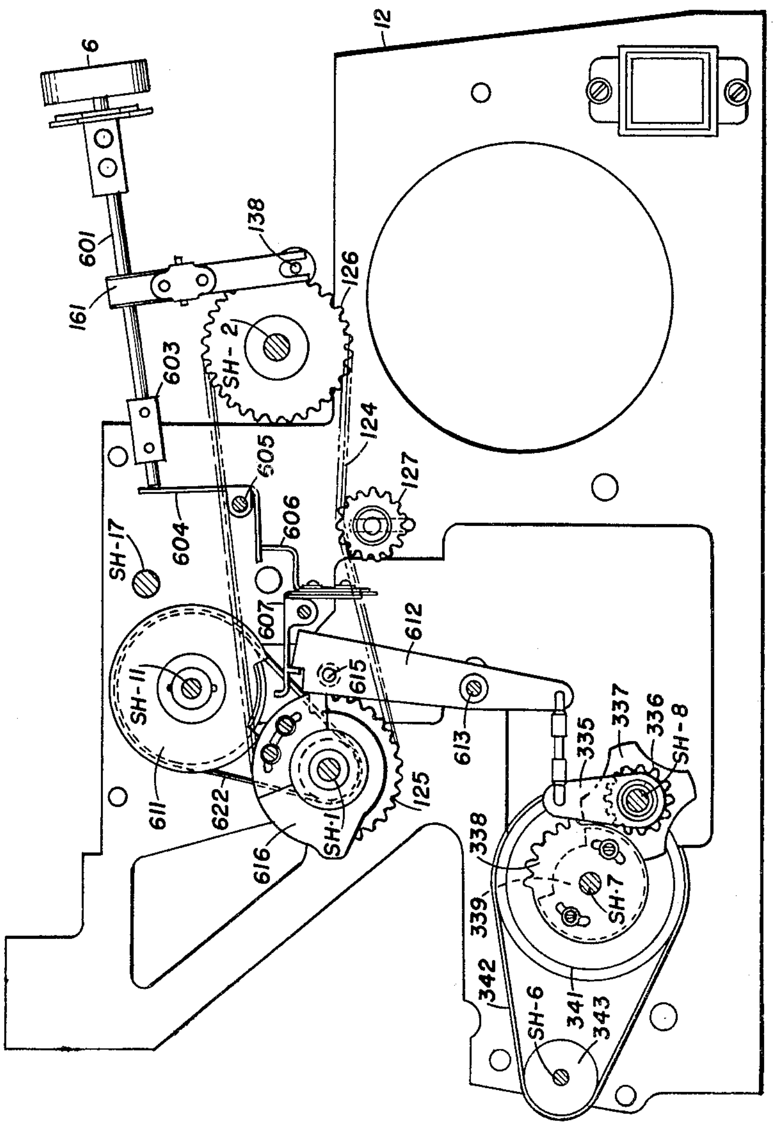
FIG. 10 is a sectional view taken along lines 10—10 of FIG. 4.

The peripheral surface of the copy drum is provided wiht slots 131 parallel and in line with each other through which gripper fingers 132 extend to grip the leading edge of a document against the peripheral surface of the copy drum. The gripper fingers are secured by screws 107 on rock shaft 133 which is rotatively mounted in the end plates of the copy drum in such a manner that upon rotation of the rock shaft the gripper fingers are moved in unison into and out of operative pressure relationship with the peripheral surface of the copy drum. The gripper fingers are normally biased into operative pressure relationship against the peripheral surface of the copy drum by means of a spring 134 secured at one end to a stud 135 extending from end plate 116 and connected at its other end to pin 136 extending from lever 137 secured to the left-hand end of the rock shaft as seen in FIG. 6. A second lever 137 is secured to the right-hand end of the rock shaft as seen in FIG. 9 in position to be engaged by interposer shaft 138 for opening the gripper mechanism to receive a document or to release a document. The interposer shaft 138 for opening the gripper mechanism is adapted to be moved manually either into position for operative engagement with the lever 137a on the rock shaft as the drum rotates, or alternatively into position so as to clear the lever for the purpose described in greater detail hereinafter. When the interposer shaft 138 is in its operative position as shown in FIG. 9, the rock shaft is automatically actuated during each revolution of the copy drum so that a document retained by the gripper fingers is released for delivery to a return tray 3 and the gripper fingers remain open sufficiently long enough to receive a new or second document. To limit the radial movement of the rock shaft a stud 139 is secured to end plate 116 to stop radial movement of lever 137.

To permit multiple scanning of a document the interposer shaft 138 is moved out of interference relation (to the right in FIG. 9) of lever 137a by an operator through the manipulation of control knob 6 as described in greater detail hereinafter.

The interposer shaft 138 is slidably journaled in a housing 153 and housing cap 154 secured to frame plate 11 by means of screws 155 threaded therein. The interposer shaft 138 is normally biased into interference relation with cam 137a by means of spring 156 encircling the interposer shaft and abutting at opposite ends against the housing cap 154 and the spring washer 157 held in place by retaining lock 158 positioned in a suitable groove formed in the interposer shaft.

An actuator lever 161, journaled on pin 162 positioned in bracket 163 secured to frame plate 11, is used to move the interposer shaft out of interference relation to cam 137a. The bifurcated end of the actuator lever encircles the interposer shaft behind the head formed at one end thereon, and at its other end the actuator is positioned to be actuated by a cam 164 fixed to control shaft 601.

To permit a document retained by the document stops to be gripped by the gripper fingers of the copy drum, the actuator 102 of copy guide 32 is positioned on rod 104 so that it extends beyond the right-hand edge of the copy drum in interference relation with the rock shaft 133 whereby the rod 104 is moved clockwise as seen in FIG. 5 to rotate the document stops out of engagement with the leading edge of the document in timed relationship with the gripping of the leading edge of the document by the gripper fingers 132.

As the document, gripped at its leading edge between the gripper fingers and the peripheral surface of the copy drum, is transported thereby through the copying station, as defined by the slotted light reflector 23, successive portions of the document are uniformly illuminated by lamps 29. As shown in the electrical wiring diagram four lamps are used to illuminate the copy, that is, a pair of fluorescent lamps LMP–2 and LMP–3 and a pair of incandescent lamps LMP–4 and LMP–5. To receive the image of the document reflected through the light reflector there is provided an object mirror 26 which reflects the image through lens 27. An image mirror 28 is positioned in the light path from the lens to reflect the image onto the drum through the slot aperture of the light shield 24. The lens 27 and the two mirrors are suitably secured to an optical mounting bracket 141 secured to the top of plates 10 and 11. Light baffles 142 are secured to the underside of the optical mounting bracket 141 to shield the lens 27 from extraneous light.

The light shield 24 is simply an open elongated box, the bottom wall of which has a narrow slot aperture 25 extending across its length. The light shield is suitably mounted, by clamp assembly 143 to arbor 144 extending between plates 10 and 11, directly above and in close proximity to the peripheral surface of the xerographic drum with the center line of the slot aperture parallel to the axis of shaft SH–1. As a document is conveyed through the copying station, the trailing portion of the document is retained against the peripheral surface of the copy drum by document guides 103 on rod 104 and then, as it leaves the copying station, by a second set of document retaining clips 103a of paper guide 33. These guides also perform the function of holding creased or wrinkled documents flat in the exposure region. As shown, the paper guide 33 consists of a pair of supports 145 and 145a secured to the side plates 10 and 11, curved document guides 146 extending between the supports, and with the second set of document retaining clips 103 secured to the support 145a in position for the curved portion of the document retaining clips to ride against the peripheral surface of the copy drum.

After a document has been scanned, the rock shaft 133 is actuated to release the document whereby it is forwarded by feed-out rollers 34 coacting with the peripheral surface of the copy drum through the document feed-out guides 30 to return tray 3.

The feed-out rollers 34 are rotatably mounted on arms 147 journaled on axle 148 secured against rotation between the plates 10 and 11, each of the arms 147 being biased by means of a torsion spring 151 to yieldingly force the feed-out rollers carried thereby against the peripheral surface of the drum or against a document sandwiched therebetween, one end of each spring butting against a radial pin 152 extending from the axle and the other end of each spring butting against the arm 147 with which it coacts.

*Development system*

In order to effect development of the electrostatic latent image on the cylindrical xerographic plate, the developing system shown includes a developer apparatus which coacts with the cylindrical xerographic plate or drum to form a development zone wherein the charged and exposed surface of the drum is developed to form a powder image of the copy.

For this purpose a developer housing is mounted adjacent to the xerographic drum to form the development zone. Mounted within the developer housing is a driven bucket-type conveyor used to carry the developer material previously supplied to the developer housing to the upper portion of the developer housing from where the developer material is cascaded over a hopper chute onto the drum. As the developer material cascades over the drum toner particles of the developer material adhere electrostatically to the previously formed electrostatic latent image areas on the drum, the remaining developer material falling off the peripheral surface of the drum into the bottom of the developer housing. Toner particles consumed during the development operation to form the visible powder images are replenished by a toner dispenser 37 mounted within the developer housing.

Specifically, the developer assembly or apparatus 35 includes a box-like developer housing having side walls 201 and 202 and a sheet metal outer shell or cover 203 forming in the lower portion thereof a reservoir for developer material 36, these elements being held together, with seals 204 interposed therebetween, by tie rods 205 to form a unitary structure. As shown, the side walls are formed with a concave edge portion in conformity with the shape of a xerographic plate to permit the developer housing to be positioned closely adjacent to the xerographic drum. Seals 206 are secured, as by fasteners 209 to the concave edge portions of the side walls to contact the outer edges of the xerographic drum to form a powder tight seal between the developer assembly and the xerographic drum.

A suitable bucket-type conveyor is used to convey developer material from the reservoir portion of the developer housing to the upper portion of the developer housing from where it is cascaded over the xerographic drum. In the embodiment disclosed the bucket-type conveyor consists of a series of parallel spaced buckets 207 secured as by staples or rivets to a pair of endless conveyor belts 208 wrapped around conveyor pulleys 211, having pins 212 thereon to engage the lugs of the conveyor belts, secured to the drive and idler shafts 213 and 214, respectively, to rotate therewith, the shafts being journaled in bearings 215.

Each bearing is mounted in a cup-shaped bearing housing 216, one end of the bearing butting against a seal 217 and the other end butting against socket plate 218, each socket plate and bearing housing assembly being secured by means of screws 219 to the side walls of the developer housing. Suitable thrust washers 221 encircle the shafts between each pulley and the bearing housing adjacent thereto.

The conveyor is actuated by means of gear 222 secured to drive shaft 213, outboard of the developer housing, which meshes with gear 223 secured to the shaft of gear head motor MOT–4 mounted on spacers 224 secured to the side walls 202.

To deflect the developing material and to spread this material across the face of the drum as the developing material is emptied out of the conveyor buckets by gravity, a hopper chute 225 is secured to the side walls of the developer housing. As the xerographic drum rotates, developing material previously tumbled over the flanged hopper chute onto the drum will cascade over the drum and eventually fall off or be thrown off to the surface of the xerographic drum to fall into the reservoir portion of the developer housing, a pick-off chute 226 being secured to the side walls in position to overlie the bottom of the housing whereby developer material is directed to the reservoir portion of the developer housing.

For removably supporting the developer assembly in operative position adjacent to the xerographic drum the lower end extensions of the side plates are formed with notched portions 228 whereby the assembly is supported on rod 231 extending between plates 10 and 11 and secured thereto. By this arrangement the assembly can be pivoted around rod 231 either toward the xerographic drum to place it in operative relation thereto, or it can be pivoted away from the drum to permit either servicing of the assembly or removal of the assembly from the machine.

To maintain the developer assembly in operative position adjacent to the xerographic drum, the side walls are provided with outwardly extending brackets 229 adapted to receive screws 232 by means of which the assembly is adjustably and removably secured to the back edges of plate 10 and to bracket 233 on plate 11.

As shown, each of the upper screws 232 is threaded through the brackets 229 to abut against plate 10 or bracket 233, whereas the bottom screws 232 extend through suitable apertures in brackets and are threaded into plate 10 or bracket 233 to hold the assembly in position.

As the developing mixture is cascaded over the xerographic drum, toner particles are electrostatically pulled away from the carrier component of the developer material and deposited on the drum to form xerographic powder images, while the partially denuded carrier particles pass off the drum into the reservoir. As toner powder images are formed, additional toner particles must be supplied to the developing mixture in proportion to the amount of toner deposited on the drum. To supply additional toner particles to the developer mixture, a toner dispenser is used to accurately meter toner to the developer mixture and is mounted in the developer housing through a suitable opening formed in the top, back portion of the outer shell.

Referring now in particular to the figures which illustrate a preferred embodiment of the toner dispenser 37, the toner dispenser includes a container for toner formed as a box having a top plate 241 to which is secured as by spot welding, two depending end plates 242 having a lower convex shaped portion, and cut-out portions centrally located therein, a depending left-hand bearing plate 243 and an enclosure or base plate 244 formed to match the contour of the end plates. The container is closed at one end by dust cap 245 and at its other end by right-hand bearing plate 246 and the elements attached thereto as described in greater detail hereinafter.

The container is supported by means of the top plate 241 adapted to extend beyond the cut-out portion of the outer shell to rest on the top portion of the outer shell of the developer housing, with a suitable gasket or seal 247 sandwiched therebetween, the container being held in position by screws 232 passing through the top plates and threaded into the outer shell of the developer housing.

The top plate is provided with an inlet opening 248 through which toner may be deposited within the container, the inlet opening being closable by means of cover 251 pivotally secured by hinge 252 to the top plate, the hinge being secured at one end to the cover plate and at its other end to the top plate. A gasket 253 encircles the outer edges of the cover in position to contact the top plate, so that, when the cover is closed the gasket is pressed against the top plate by means of the spring clips 227 pivotally secured to the outer shell of the developer housing.

Toner placed in the container is dispensed through apertures 254 in the lower portion of the base plate by means of cylindrical brush 255 secured to the threaded portions of drive shaft 256 journaled in bearings 257 and 257A mounted in bearing housings 258 and 258A secured to the right-hand bearing plate 246 and the left-hand bearing plate 243. The brush is secured axially against the shoulder of the drive shaft 256 by means of retaining ring 259 positioned in a suitable groove provided in the drive shaft.

A beater shaft 261 carrying a wire beater arm 262 secured thereto is journaled in bearings 263 and 263A mounted in bearing housings 264 and 264A and driven by gear 265 attached thereto which meshes with gear 266 on shaft 256. Axial alignment of the beater shaft is maintained at one end by bearing housing cover 271 mounted on the bearing housing 264A secured to the right-hand bearing plate, and at its other end by screw 272 threaded through dust cap 245 and secured by lock nut 273.

The bearing housings 258, 258A, 264 and 264A inserted through apertures formed in the bearing plates, are secured to their respective bearing plates as by peening over the edges of the bearing housing. Dust seals 267 and 268 encircle shafts 256 and 261, respectively, within the bearing housings to protect the bearings mounted therein from the toner particles.

The toner dispenser when mounted in the developer housing is driven by an extension shaft 274 inserted through a suitable aperture in the side wall 202 of the developer housing to engage the threaded or right-hand end of shaft 256, a washer seal, not shown, butting against the inside surface of the side wall around the aperture therein. The extension shaft carries a control lever 275 rotatably mounted thereon, a ratchet wheel 276 fixed by pin 277 thereon, and one end of guide lever 278 rotatably mounted thereon by means of bearing bushing 279 held in place by retaining ring 281 positioned in a suitable groove formed on the end of the extension shaft.

The ratchet wheel is moved by means of actuating arm or pawl 282 having a bearing 283 mounted thereon by means of which the actuating arm or pawl is journaled on bushing 284 encircling stud 285 secured to the guide lever. The actuating arm or pawl is biased into driving engagement with the ratchet wheel by a torsion spring 286 secured at one end to the actuating arm or pawl 282 and at its other end to the guide lever 278.

To effect movement of the actuating arm or pawl 282 to index the ratchet wheel 276, the guide lever 278 is slotted as at 287 to slidably receive drive pin 288 of the crank arm 289 secured to gear 222 mounted on drive shaft 213 of the developer conveyor, whereby the toner dispenser is operated at a rate dependent on the speed at which the developer conveyor is operated.

To vary the dispensing rate of the toner dispenser, which is dependent on the number of revolutions of the brush per unit of time, the number of revolutions of the brush per unit of time must be varied. This may be done by varying the speed of the developer conveyor or with a fixed rate of speed for the developer conveyor the toner dispensing rate may be varied by varying the degrees through which the ratchet wheel is indexed by the actuating arm or pawl. In the embodiment shown the length of throw of the actuating arm or pawl 282 per cycle is adjusted by means of control lever 275. Control lever 275 is provided with a cam portion 291 which can be variably positioned to interfere with the actuating arm or pawl to disengage it from the ratchet wheel after a predetermined length of travel.

To secure the control lever in a predetermined position, as determined by the operator, while still permitting the operator to move the control lever to a different setting movement, there is provided an adjustment plate 292 with scaled serrations thereon by means of which the control lever may be indexed at a predetermined position. To force the control lever into frictional engagement with the adjustment plate 292 there is provided a friction plate 293 secured along with the adjustment plate to the side wall 202 of the developer housing by means of cap screws 294 threaded into the side wall, the friction plate being biased toward the control lever and the adjustment plate by springs 295 encircling the cap screws between the friction plate and the washer 296 butting against the head of the cap screws.

*Paper feed system*

Although any suitable paper feed mechanism may be used for seriatim feeding of cut sheet material into contact with the xerographic drum at the transfer station, the paper feed mechanism, used in the preferred embodiment of the invention, is of the type disclosed in copending application Serial No. 77,957, filed concurrently herewith on December 23, 1960, in the name of Roger H. Eichorn.

The sheet feeding mechanism is positioned at the transfer station of the xerographic apparatus for seriatim feeding of cut sheet support material, such as paper or the like, into contact with the xerographic drum so that the developed powder image on the surface of the drum can be transferred to the support material. The sheet feeding mechanism consists of a tray for holding a supply of cut sheet support material, a separator roll for separating a single sheet of support material from the tray and forwarding it to a guide having a receiving slot in the front thereof and a movable gate to block the receiving slot so that the sheet can be arrested and held for delivery by a sheet conveyor mechanism. The sheet of support material forwarded into the guide by the separator roll is advanced by a sheet conveyor mechanism into contact with the xerographic drum adjacent to the corona transfer device whereat the powder image previously formed on the drum is transferred from the drum to the sheet of support material, the sheet of support material then being forwarded by the conveyor mechanism to the heat fuser for fusing of the powder image onto the sheet, and then to a set of delivery rolls which deliver the sheet of support material to the collecting tray 3.

A supply of cut sheet support material such as paper 301, to be fed one at a time to the sheet conveyor mechanism 43 is held in a paper tray 41 movably positioned at the front of the machine between the frame plates 10 and 11 by means of a pair of conventional drawer slides 302. The paper tray is positioned above the collecting tray 3 which is also slidably mounted on a pair of conventional drawer slides (not shown) so that either of thse trays can be extended beyond the outer margin of the cabinet of the machine.

Figure 2:
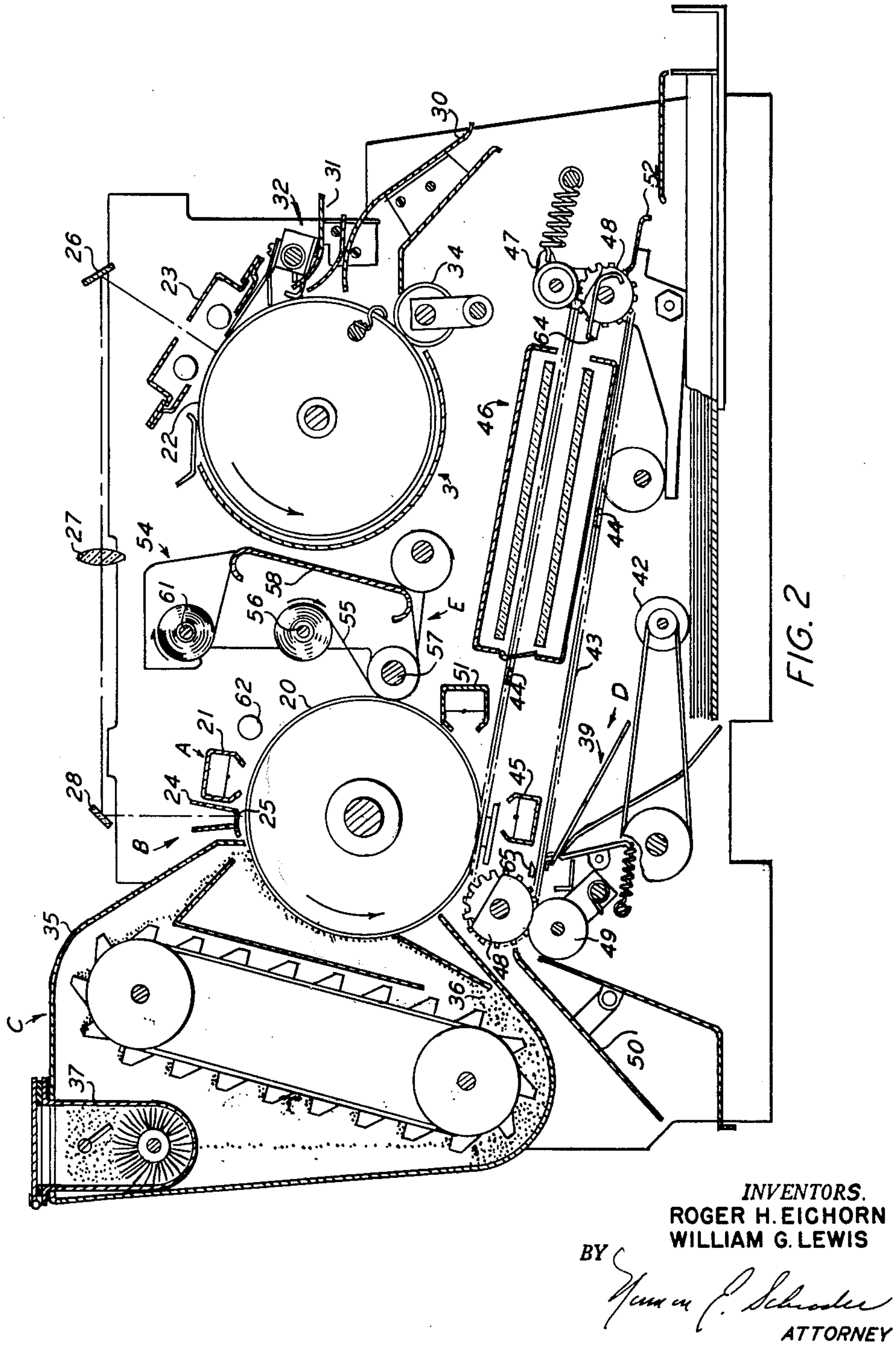
FIG. 2 is a schematic illustration of the apparatus of the invention.
Figure 3:
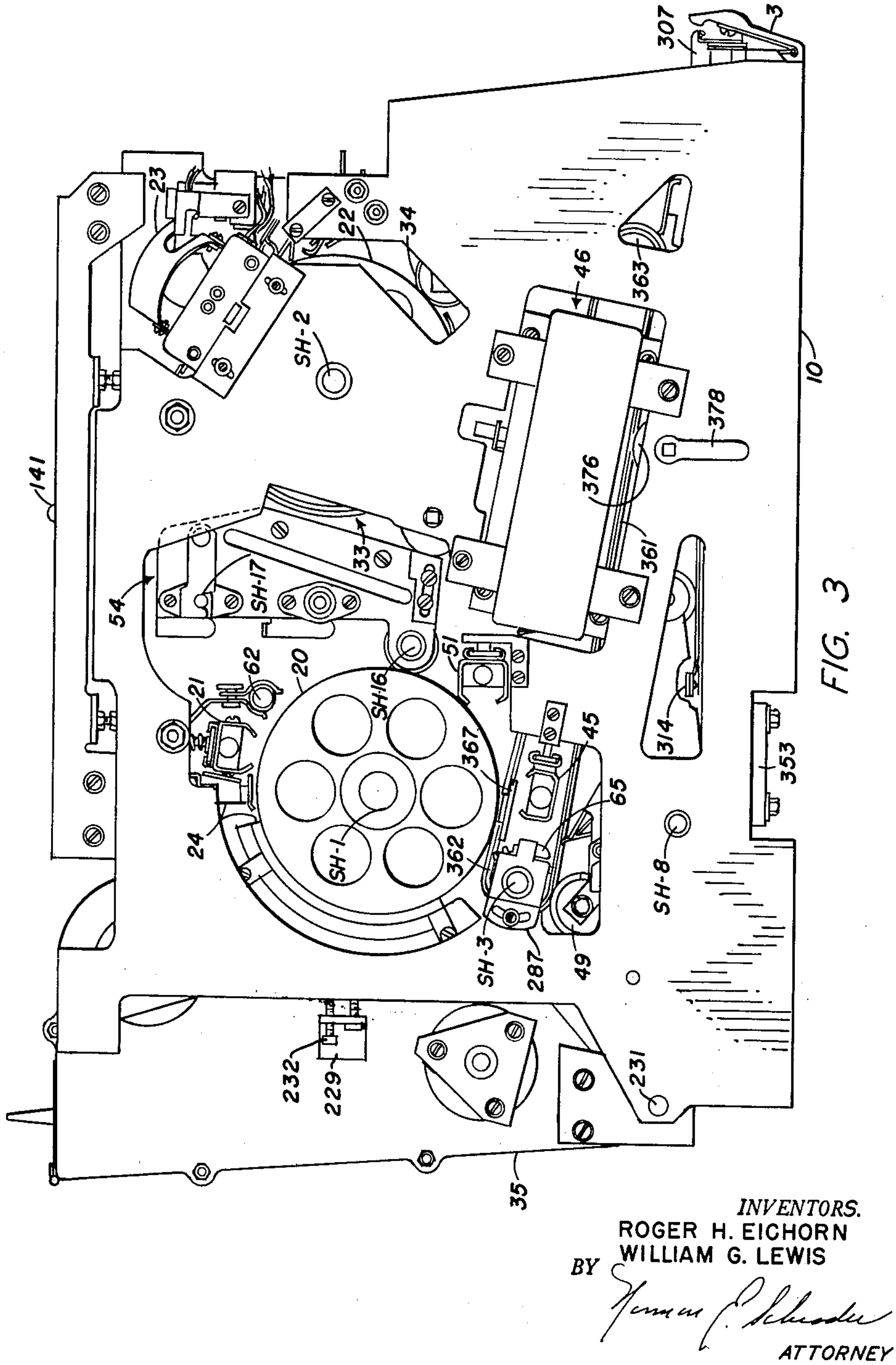
FIG. 3 is a left-hand view of the apparatus of the invention, with the cabinet covers removed.
Figure 4:
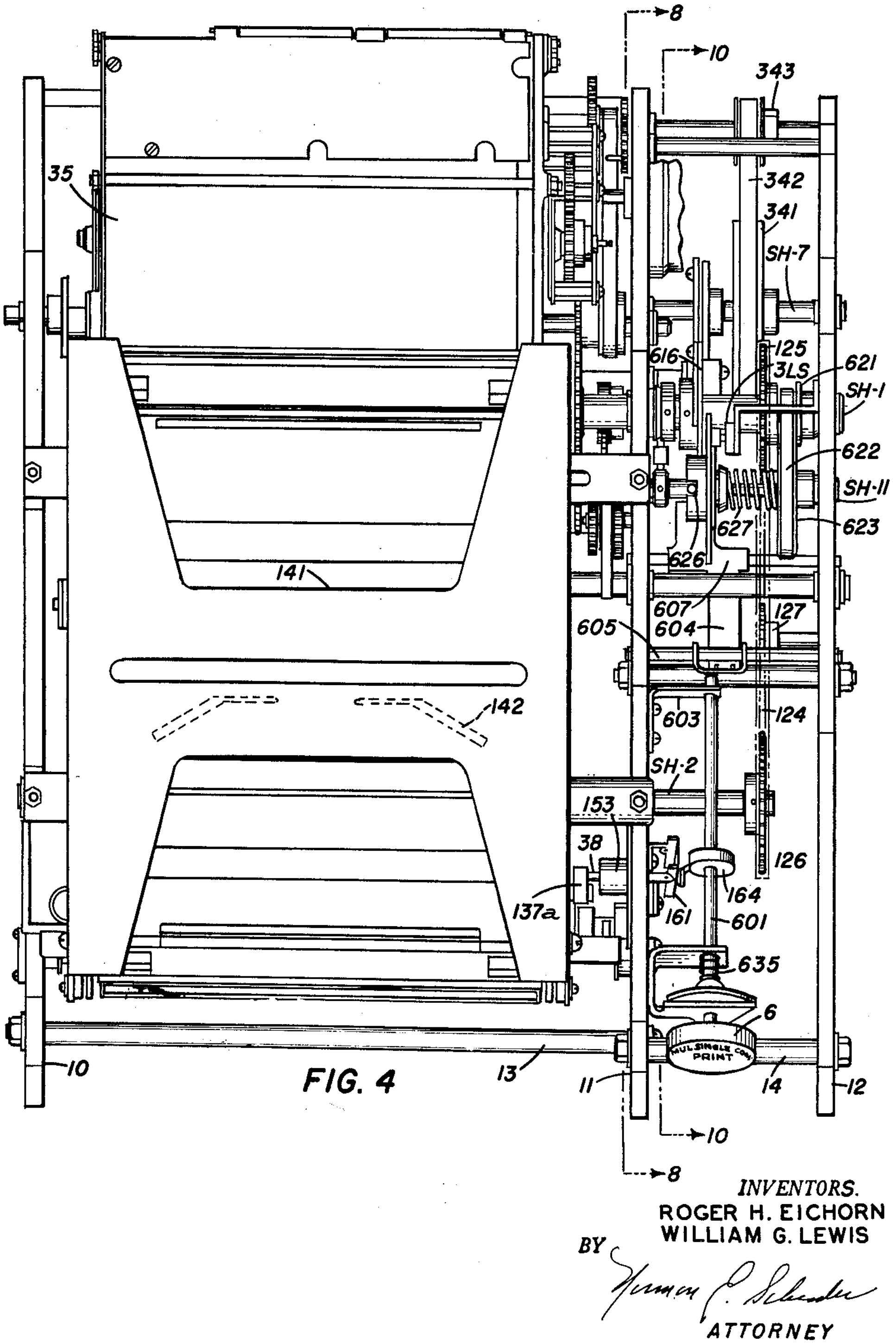
FIG. 4 is a top view of the apparatus of the invention.

The paper tray 41 includes a platform 304, vertical side walls 305 and an end wall 306, the latter having a guide plate 307 hinged thereon for purposes to be described in greater detail hereinafter. In order to insure separation of the top-most sheet from the remainder of the stack of support material in the tray, there is provided a left-hand corner separator 308 and a right-hand corner separator 309 positioned and secured on opposite sides of the platform. Each corner separator includes a substantially vertical front stop portion 311 for aligning the leading edges of the sheets, and an inwardly extending lip portion 312 adapted to rest upon the topmost sheet of the stack to act as a stripper pin, as is well known in the art, and a spring extension strip portion 313 by means of which the lip portion of the corner separator is continually biased into contact with the topmost sheet of the stack. Cam follower buttons 314 are secured to the corner separators in position to be engaged by cams 315 connected on a portion of the drawer slides secured to the frame plates 10 and 11, whereby as a paper tray is withdrawn from the position shown in FIGS. 2 and 4 to permit the placing of a new stack of support material in the tray, the cams will cause the corner separators to lift sufficiently high above the bottom plate so that a stack of support material can be placed under the corner separators. As the paper tray is again advanced to its normal operating position as shown in FIGS. 2 and 5, the buttons 314 slide off the cams to engage the leading edges of the sheets in the stack as shown in these figures.

Figure 13:
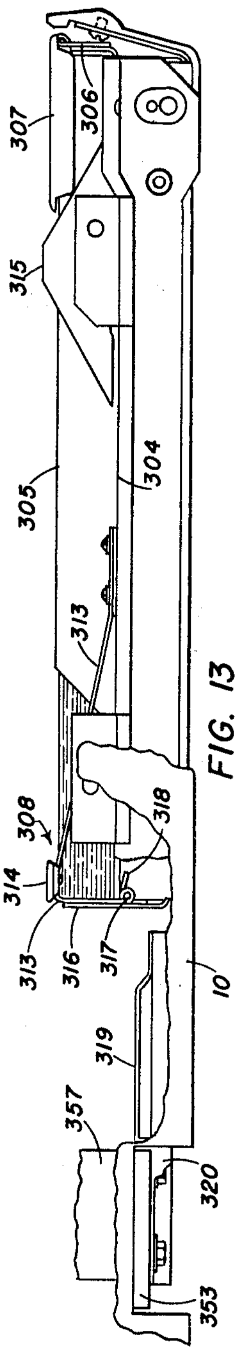
FIG. 13 is an enlarged left-hand view of the paper tray assembly.
Figure 16:
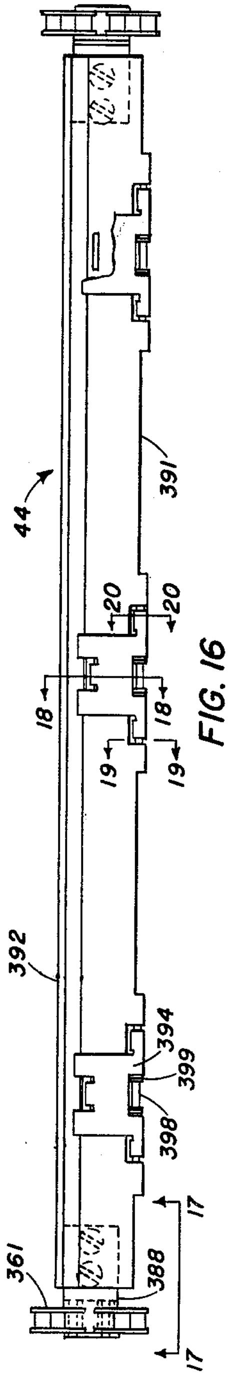
FIG. 16 is an enlarged top view of a paper gripper.
Figure 17:
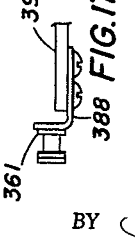
FIG. 17 is a view of the paper gripper taken along line 17—17 of FIG. 16.
Figure 20:
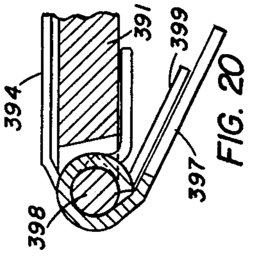
FIG. 20 is an enlarged view taken along line 20—20 of FIG. 16.
Figure 19:
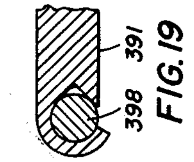
FIG. 19 is an enlarged view taken along line 19—19 of FIG. 16.
Figures 14, 15:
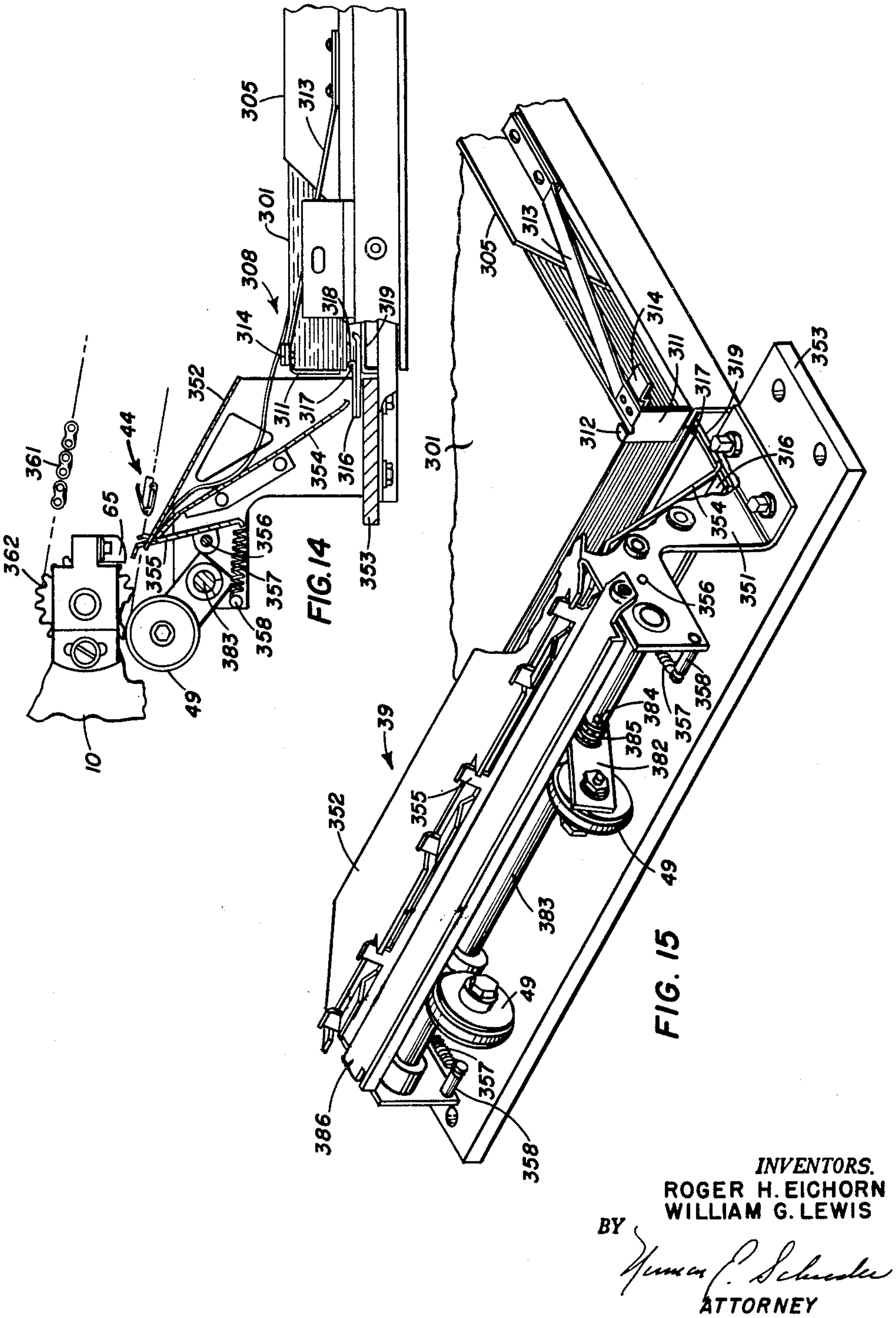
FIG. 14 is a sectional view of the paper guide mechanism and elements cooperating therewith.
FIG. 15 is a perspective view of the paper guide mechanism.
Figure 21:
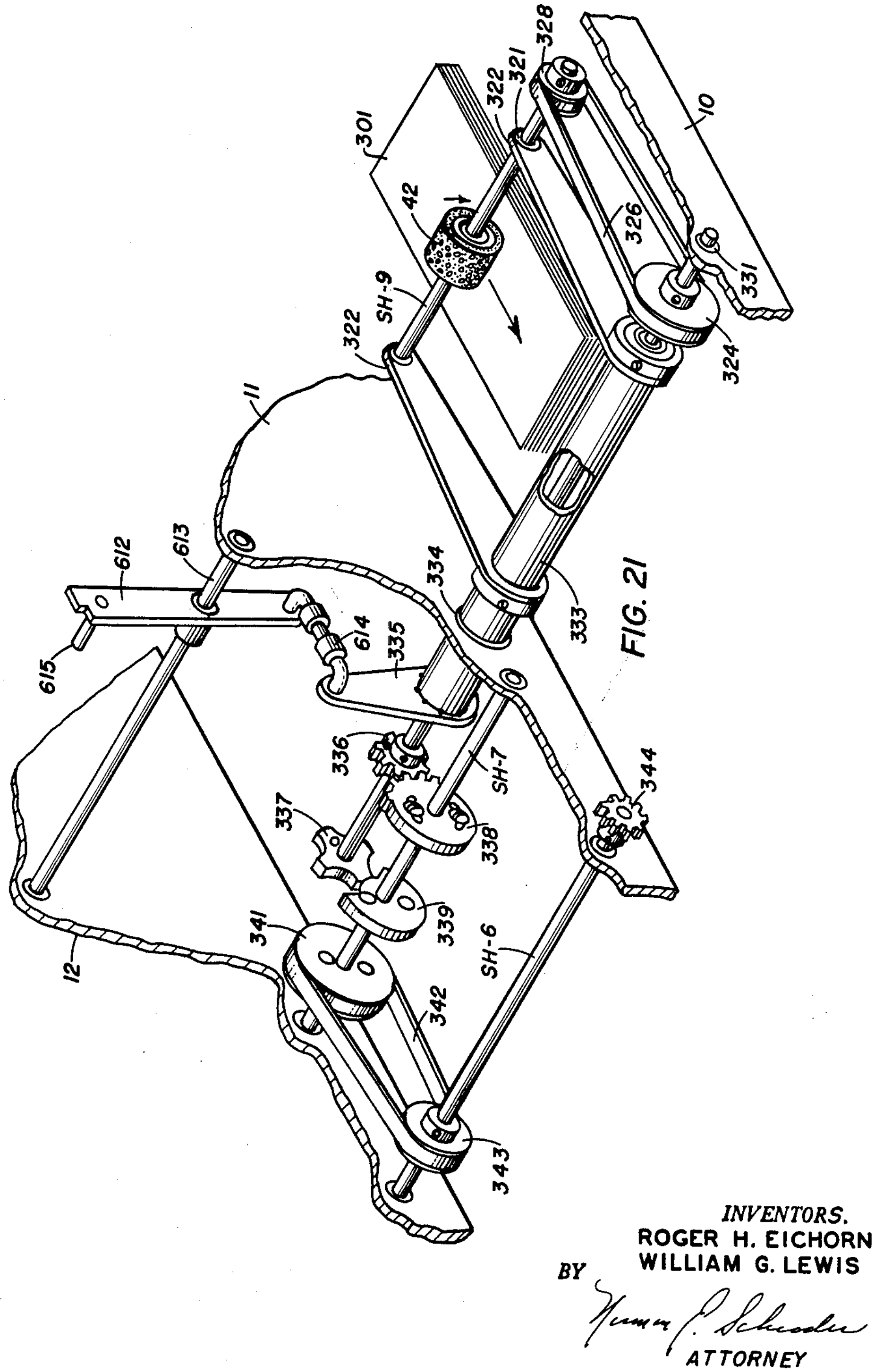
FIG. 21 is an exploded perspective view of the paper separator mechanism.

To align the leading edges of the sheets prior to the engagement of the corner separators thereon, there is provided a gate 316 pivotally secured by hinge 317 in the left-hand end of the paper tray as seen in FIGS. 13 and 14. A spring 318 is secured to the gate to normally bias the gate into a vertical position. A depending finger portion on the gate is positioned to engage a cam 319 secured to brace 320 so that when the paper tray is advanced to its operative position as shown in FIG. 2 the gate is forced to swing downward, out of interference relationship with the sheets in the paper tray so that they may be advanced by the separator roller 42 into the guide 39.

To feed sheets of support material one at a time from the paper tray to the guide for pick-up by the sheet conveyor, there is provided a paper feeding and separating means comprising an intermittently driven separator roller 42 mounted on a driven shaft SH–9 journaled in suitable bearings 321 mounted in one end of arms 322, the opposite end of the arms being suitably secured, as by welding, to torque tube 333.

As shown, the separator roll 42, usually made of rubber or other suitable material, is secured, as by bonding, to a cylindrical core 323 which is mounted by means of a conventional slip clutch 324 on the shaft SH–9 and is held in position thereon by means of end plates 325. The slip clutch permits the separator roll to be rotated, either by rotation of shaft SH–9, or by frictional contact with a sheet of support material as the sheet is pulled forward by the sheet conveyor.

Shaft SH–9 is driven by shaft SH–8 by means of belt 326 which runs on pulleys 327 and 328 fixedly mounted on shaft SH–8 and SH–9, respectively. Shaft SH–9 is held in axial alignment in the arms 322 by the pulley 328 secured to the shaft outboard of one arm and by a retaining ring 329 positioned in a suitable groove in the shaft outboard of the other arm.

Shaft SH–8 is journaled at one end in bearing 331 positioned in frame plate 10, and intermediate its ends by means of bearings 332 positioned within torque tube 333 rotatably positioned by means of flanged bearing 334 mounted in frame plate 11, whereby either the torque tube or the shaft SH–8 can be rotated with respect to each other.

The torque tube 333 encircling shaft SH–8 is thus mounted about the axis of the shaft to be oscillated by lever 335 fixed thereon, so that separator roll 42 is moved from a first position out of contact with the sheets in the supply tray to a second position in which the separator roll is moved into friction contact with the top sheet in the supply tray.

Figure 11:
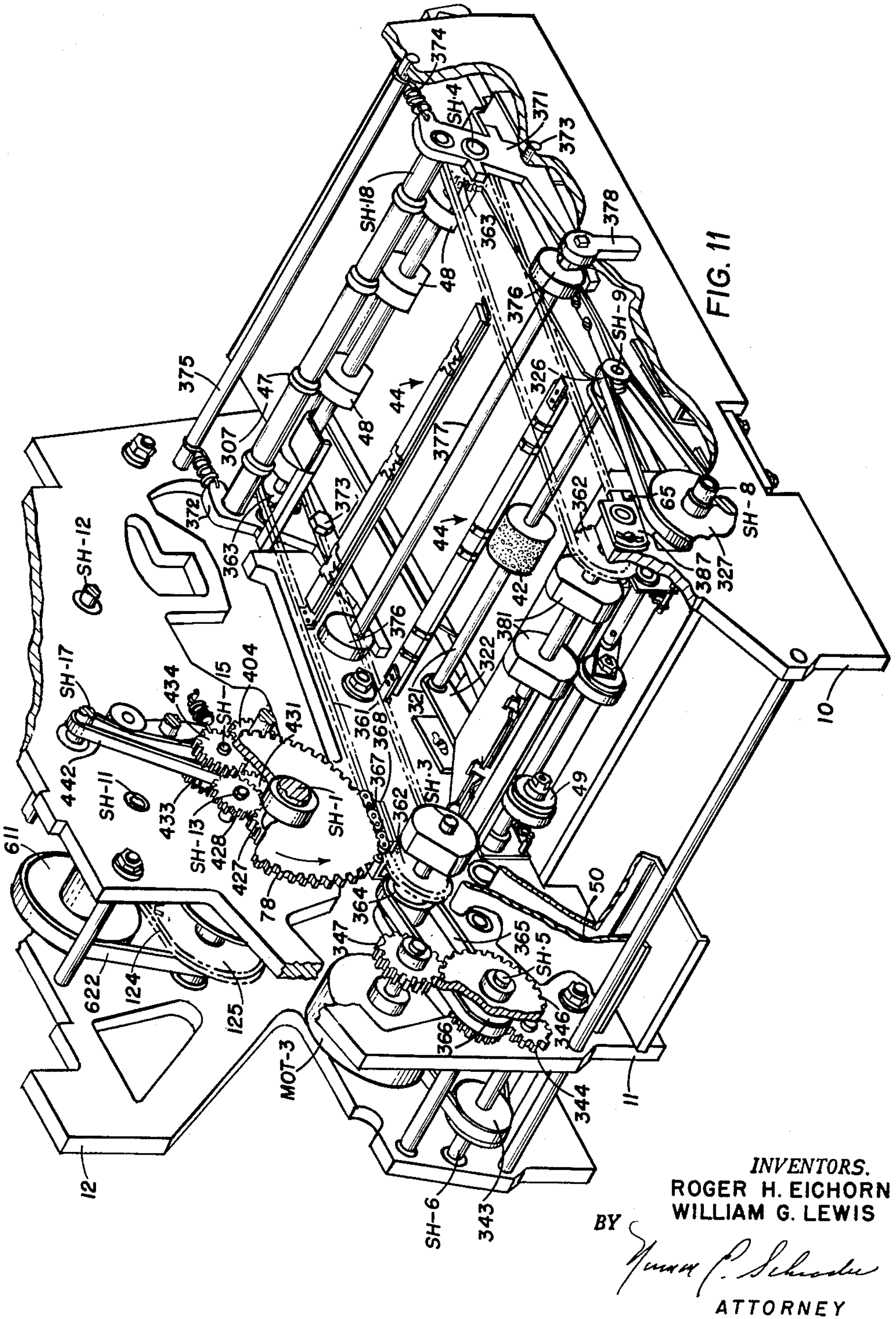
FIG. 11 is a perspective view of the paper feed mechanism of the apparatus.

While the separator roll is in contact with the top sheet, it is rotated in the direction shown by the arrow in FIG. 11 to separate the topmost sheet and forward it to guide 39. Shaft SH–9, which supports the separator roll, is operatively connected by means of the belt 326 to shaft SH–8, as previously described, shaft SH–8 being intermittently driven by means of the gear 336 and segmental index lock 337 secured thereon which engage the segmented gear 338 and the segmental lock 339, respectively, mounted on shaft SH–7. Shaft SH–7, journaled in suitable bearings positioned in frame plates 11 and 12, is operatively connected to shaft SH–6 by means of timing belt 342 which runs on pulleys 341 and 343 connected to shaft SH–7 and SH–6, respectively. Gear 344 fixed on the end of shaft SH–6, which extends beyond frame plate 11, engages gear 345 fixed on intermediate shaft SH–5 operatively connected to the main drive motor MOT–3 by gears 346 and 347 fixedly mounted on shaft SH–5 and on the shaft of motor MOT–3, respectively.

When the separator roll is brought into contact with the top sheet of paper in the supply tray and rotated in the direction shown, it will forward a sheet of support material into the guide 39 where its forward progress is stopped by the gate at the outlet of the guide. The separator roll continues to rotate to feed the topmost sheet, causing the sheet to buckle in the guide for a purpose to be described in detail hereinafter.

Referring now to the guide 39, it includes a paper frame having two vertical side walls 351 and a connecting upwardly slanting paper slide 352 formed integral therewith, which is secured to a mounting plate 353 positioned directly beneath the sheet conveyor, the mounting plate being fastened to the frame plates 10 and 11. A lower flanged paper slide 354 extends between the side walls of the paper frame to form with the paper slide 352 a receiving chute for the sheet material forwarded by the separator roll. The trailing edges of these two slides are suitably notched to permit a gate 355 to be movably positioned to close the discharge end of the chute. The gate 355 is pivotally mounted on a gate shaft 356 extending between and secured to the side walls 351 of the paper frame and is normally biased into position to close the discharge end of the chute by means of springs 357. Each of these springs is secured at one end to the gate and at its opposite end to a pin 358 mounted on a side wall of the paper frame. As seen in FIGS. 14 and 15 the upper portion of the gate 355 has bent closure members formed thereon adapted to rest, when biased by the spring 357 against the trailing edges of the paper slides to close the opening in the chute, the closure members which rest against the upper slide extend beyond the slides in interference relationship with a paper gripper 44 as it passes thereover, so that, the gate is actuated by a paper gripper to release a sheet thereto.

A sheet of support material, such as paper, forwarded by the separator roll to the guide 39 is forwarded from the guide by endless conveyor to the xerographic drum adjacent to corona transfer device, whereat a xerographic powder image previously formed on the drum is transferred from the drum to the sheet. The sheet is then forwarded by the conveyor to the heat fuser 46 whereat the powder image on the sheet material is permanently fused thereon, and then to the set of delivery rolls 47 and 48 which deliver the sheet of support material to the return tray 3.

Referring in particular to FIGS. 7 and 11, the conveyor 43 includes two endless roller chains 361 which pass from a set of drive sprockets 362 carried by shaft SH–3 to, and around a set of sprockets 363 on shaft SH–4 which guide the chains in a path tangential to the surface of the xerographic drum. These two sets of sprockets are fixedly positioned on their respective shafts to space the chains apart from each other by a distance greater than the length of the drum to afford complete use of the xerographic drum plate surface.

In the embodiment of the conveyor apparatus shown, the chains carrying the two paper grippers 44 are equally spaced from each other along the length of the chains, and positioned on the chains at right angles to the path of travel of the chain for movement therewith and in a circuit between sheet receiving and sheet delivery stations identified, respectively, as the output of the paper guide 39, and the delivery rollers 47 and 48. Means are provided at these stations to cause the paper grippers to take hold of the front or leading edge of a sheet of support material at the receiving station, that is, from guide 39, and to hold this sheet while traveling to the delivery station and there to release the sheet for discharge by the delivery rollers from the machine.

Two paper grippers are used in the preferred embodiment of the machine so that as one paper gripper moved from the receiving station carrying a sheet of transfer material to the delivery station, the other paper gripper will move from the delivery station to the receiving station to be in position to receive the next sheet of support material.

Conveyor shaft SH–3, carrying the drive sprockets 362, is journaled in the frame plates 10 and 11 and is driven by pulley 364 connected by drive belt 365 to pulley 366 fixed on shaft SH–5 between the gears 345 and 346.

To insure synchronized movement of a sheet of support material with the xerographic drum to effect registered transfer of the powder image from the drum to the sheet material, the xerographic drum is driven by means of a chain conveyor. The sprocket 78, secured to the drum shaft SH–1, is positioned thereon to be driven by the right-hand chain 361, as seen in FIG. 6, that is, the chain nearest frame plate 11. The pitch diameter of the sprocket 78 is equal to the diameter of the drum so that the lineal surface speed of the drum is equal to the speed of travel of the chain of the sheet conveyor, as represented by the pitch line of the chain. To insure effective engagement of the chain with the sprocket 78 there is provided a guide 367 positioned adjacent to the sprocket by means of a bracket 368 secured to plate 11 which forces the chain into driving relation with the sprocket. The guide 367, formed in the shape of an inverted T, is positioned so that chain is guided into contact with the sprocket 78, with the pitch line or center of the chain moving in a path tangentially to the pitch line diameter of the sprocket to insure positive contact between the chain and the sprocket and to eliminate the possibility of any backlash occurring between the chain and the sprocket.

Shaft SH–4, carrying sprockets 363 thereon, is suitably journaled at its opposite ends in a left-hand conveyor support 371 and a right-hand conveyor support 372 pivotally secured by means of shoulder screws 373 to frame plates 10 and 11, respectively, whereby the shaft SH–4 can be oscillated in an arc about the axis of the shoulder screws from a first position in which tension is applied to the chain of the conveyor, to a second position in which the chains are slackened sufficiently to either permit replacement of a chain or replacement or removal of the xerographic drum from the machine.

Springs 374 connected at one end to the conveyor supports and at their other end to a rod 375, fixed in frame plates 10 and 11, are used to normally bias the conveyor supports in a clockwise direction as shown in FIG. 11 to maintain the chains of the conveyor mechanism in tension. To permit an operator to release the tension on the chains of the conveyor to either replace a chain or to permit removal of the xerographic drum, there is provided a pair of cams 376 fixed to a cam actuator shaft 377, suitably journaled in frame plates 10 and 11, by means of which an operator can rotate the conveyor supports in a counterclockwise direction as shown in FIG. 11 against the biasing action of the spring to release the tension on the chains. The cam actuator shaft 377 is provided with a squared end portion extending beyond frame plate 10 adapted to receive a lever 378 by means of which the operator can rotate the cams.

Fixed to the shaft SH–3 for rotation therewith are four D-shaped paper guide rolls 48A, the center two of which coact with the paper abort rolls 49 to feed a sheet of support material through the abort paper guide 50 from the machine, if for any reason a sheet forwarded by the separator roll is not adequately gripped by a paper gripper for delivery through the transfer station of the machine. The abort rolls 49 are suitably rotatably mounted on a pair of abort arms 382 suitably journaled on the abort pivot shaft 383 secured to the side walls of the paper guide 39. The abort rolls 49 are normally biased in the direction toward the paper guide rolls to contact the paper guide rolls by means of torsion springs 385, each of which is secured at one end to a pin 384 extending radially from the abort pivot shaft and its other end connected to an abort arm. Movement of the abort rolls toward the paper guide rolls is limited by a paper abort stop 386 adjustably secured to the side walls 351 of the paper guide whereby the movement of the abort rolls can be carried by the abort arms adjusted to prevent them from riding over the cord portion of the D-shaped paper guide rolls.

A set of rolls 48 similar to the D-shaped paper guide rolls 48A, are fixed to shaft SH–4 for rotation therewith, these rolls cooperating with the delivery rolls 47 to feed sheets of support material from the machine. The delivery rolls 47, preferably made of rubber or similar material, are mounted for rotation therewith on idler shaft SH–18 suitably journaled at opposite ends in the left-hand and right-hand conveyor supports.

In the embodiment shown the paper grippers are positioned to grip the leading edge of a sheet of support material in position to travel substantially along the pitch line of the chain, and of course as the sheet travels around the sprockets 362 and 363 the leading edge of the sheet will travel in a path equal to the pitch line of the sprockets. As previously described, the lineal speed of travel of the paper grippper as carried by the chain is equal to the peripheral speed of the xerographic drum, and the sheet of support material is pulled by its leading edge to and from the drum at a constant rate whereby it is prevented from slipping with respect to the peripheral surface of the drum. However, since a straight line path of travel of the support material to and from the drum cannot be accomplished by a conveyor of the length shown, the radius of the peripheral surface portion of the D-shaped paper guides 48A and the delivery rolls 48, in the embodiment shown, is made equal to the pitch radius of the sprockets 362 and 363 to permit the sheet material to be guided around the axis of the shafts SH–3 and SH–4, respectively, in a path corresponding to the path of the paper grippers. In this manner, the trailing edge of the sheet support material is guided by the paper guides in a path corresponding to the path of travel of the paper grippers about the shafts SH–3 and SH–4 at a lineal speed equal to the speed of travel of the paper grippers. The rise of the cord of the D-shaped paper guides and the delivery rolls is such that the cord surface of each guide 48A and delivery rolls 48 is positioned below the path of travel of the paper grippers, or stated in a different manner, the rise of the guides is slightly greater than the distance from the center line of the chain to the bottom of the paper grippers. The length of the chains and the spacing of the shafts SH–3 and SH–4 are so chosen so as to permit the D-shaped paper guides 48A and delivery rolls 48 to be fixed on the shafts SH–3 and SH–4 for rotation therewith, so that the paper grippers as they approach the D-shaped paper guides will mate with the cord portion of these guides for corresponding movement of these elements.

Although any suitable paper gripper may be used to grip the sheets of support material, the paper grippers 44 used are of the type disclosed in copending application Serial No. 77,957, now Patent 3,100,109, filed concurrently herewith on December 23, 1960 in the name of Roger H. Eichorn. Since both of the paper grippers used in the machine are of like construction, for simplicity, only one will be described herein.

As shown in detail in FIGS. 16 to 20, inclusive, a paper gripper 44 consists of a gripper bar 391 of a length to extend substantially between the two roller chains 361 to be connected thereto by means of clips 388 forming part of the chains when connected thereto, as is well-known in the art. The clips 388 are formed to support the gripper bar so that the top surface of the gripper bar is positioned slightly below the pitch line of the chains, whereby the gripper bar as it passes beneath the xerographic drum will not contact the peripheral surface of the xerographic drum.

A concave sheet gripper jaw 392, which may be a separate element fixed to the gripper bar or as shown formed integral therewith, extends across the rear of the gripper bar (in terms of the direction of travel of the gripper bar). The concave sheet gripper jaw is positioned to have surface contact with the leading edge of a sheet of support material as it is advanced from the paper guide 39. The concave sheet gripper jaw cooperates with the tang portions or jaws 395 of the grippers 394 to grip a sheet of support material inserted therebetween.

Each of the grippers is mounted, by means of pins 398 suitably secured to the leading edge of the gripper bar, for movement in two directions relative to the fixed concave sheet gripper jaw 392; that is, for movement from a first position in which the tangs or jaws of the gripper are in spaced-apart relation to the concave sheet gripper jaw to receive a sheet of support material therebetween, and for movement to a second position in which the tangs or jaws of the gripper are in engagement with the concave sheet gripper jaw or with a sheet of support material sandwiched therebetween. Springs 399 encircling the pins 398 are positioned with one end of the springs abutting the underside of the gripper bar and the other end of the springs abutting the cam follower portion 397 of the gripper to normally bias the tangs or jaws of the gripper into contact with the concave sheet gripper jaw or with a sheet of support material inserted therebetween. To prevent cocking of the grippers, each gripper is provided with a depending curved guide portion or tank 396 which is slidably received in a suitable slot 393 formed in the gripper bar 391, the tang also serving as a guide or stop for the leading edge of the support material.

Figure 18:
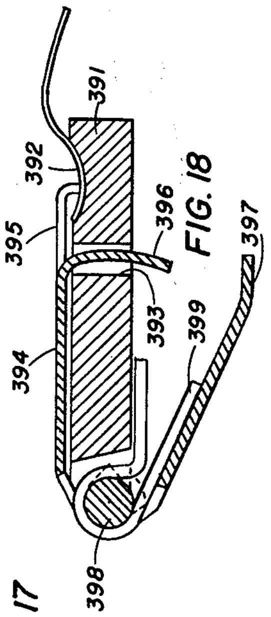
FIG. 18 is an enlarged view taken along line 18—18 of FIG. 16.

A sheet of support material gripped between the concave sheet gripper jaw and the tangs or jaws of the grippers is arched upward into contact with the drum as it passes therebeneath because of the shape of the concave sheet gripper jaw which tends to slightly bend the leading edge of a sheet as shown in FIG. 18.

Referring now to FIG. 14, a sheet of support material, such as paper, forwarded into the paper guide 39 by the action of separator roller 42 is slightly wrinkled as the separator roller continues to advance the sheet after its forward motion has been arrested by the gate 355. Thus, as a paper gripper advances over the guide, the gate 355 will be forced open as the paper gripper srikes it and at the same time the cam followers 397 of the grippers will strike the cam 65, fastened to cam supports 387 adjustably secured to frame plates 10 and 11, to open the jaws of the paper gripper to receive the sheet from the paper guide 39. Because of the slight buckle in the sheet and because at this time the separating roller is still attempting to advance the sheet, the sheet as it unbuckles will be forced beween the jaws of the paper gripper so that as the cam followers of the grippers slide off the cams the jaws will close by the biasing action of the springs 399 to grip the sheet and forward it to the delivery station of the machine.

At the delivery station, the paper gripper passes between the delivery rollers 47 and 48 and as it does so, the grippers are again actuated by means of their cam followers riding over the cam 64 secured to the shoulder portions of the left-hand and right-hand conveyor supports, thereby releasing the sheet from the paper gripper for discharge to the return tray 3 by the delivery rollers. As the sheet is advanced between delivery rollers 47 and 48, it is guided by means of guide 52 secured to the left-hand and right-hand supports and by means of the previously described guides plate 307 on paper tray 41 to the collecting tray 3.

*Fuser*

The developing material used to form the powder images are specifically chosen to permit them to be fixed to the support material either by heat fixing or vapor fixing techniques, that is, the individual particles of resin (toner) soften and coalesce when heated or plasticized by solvent, so that they become sticky and readily adhere to the support surface. Thus, although any suitable fixing device may be used, in the embodiment shown, a heat fuser of the type disclosed in copending Codichini et al. application, Serial No. 77,952, now Patent 3,076,083, filed concurrently herewith on December 23, 1960, is used to supply heat by means of radiant glass panels for fusing the powder images.

Referring now in particular to the illustrations of the fuser, there is shown a preferred embodiment of a radiant glass panel heat fuser 46 consisting of a radiant bottom panel 501 and a radiant top panel 521 mounted in spaced-apart relation to each other to permit a sheet of support material carrying an unfuser powder image thereon to be inserted therebetween for the purpose of heat fixing the powder image on the support material.

The radiant bottom panel 501 includes a base plate 502 having formed integrally therewith side walls 503 and 504 extending along the length of the plate, an end wall 505 extending along part of one end of the plate depending support members 506 adjacent to the end wall at one end of the base plate and depending support members 507 at the other end of the base plate. A retainer bracket 508 removably secured to the opposite end of the base plate from end wall 505 forms with the base plate an enclosure for a conventional radiant glass panel 510, which is thermally insulated from the enclosure by means of strip insulators 509, such as asbestos, bonded to the walls of the base plate and to the retainer bracket, and by insulator 511, such as a mat of fiberglass, sandwiched between the base plate and the radiant glass panel.

As commonly known, the radiant glass panel 510 has a resistance metallized coating on the back side of the glass which is electrically connected to terminals of a suitable conductor material, not shown, formed at opposite ends on one surface of the panel. Voltage applied to the coating heats the coating and heat is conducted to the glass which then acts as a radiator of heat.

Slotted insulators 512, preferably made of ceramic material or the like, secured to opposite ends of the base plate each movably supports a spring 513 having conductive buttons 514 mounted thereon biased by the spring into electrical contact with the terminals of the radiant glass panel. Each of the springs 513, which serve as a bus bar, is connected by a wire 515 to a suitable source of electrical power.

Paper guides or supports 516, such as wire grids, secured at opposite ends to the side walls through suitable apertures formed therein, extend, at an angle to the direction of paper motion, across the top of the radiant glass panel to prevent a sheet of support material from coming into direct contact with the radiant glass panel. The guides are preferably placed at an angle to the direction of paper travel so that the paper will only contact the guides momentarily as it travels through the fuser.

The radiant top panel 521, similar in construction to the radiant bottom panel, includes a top plate 522 having formed integrally therewith depending side walls 523 and 524 extending along the length of the plate, a depending end wall 525 extending along part of one end of the plate, upright support members 526 adjacent to the end wall at one end of the top plate and upright support members 527 at the other end of the top plate. A retainer bracket 508 removably secured to the opposite end of the top plate from end wall 525 forms with the top plate an enclosure for a radiant glass panel 510 thermally insulated from the enclosure by strip insulators 509 bonded to the walls of the top plate and the retainer bracket, and by insulator 529 sandwiched between the top plate and the radiant glass panel.

Slotted insulators 512 secured to opposite ends of the top plate each movably support a spring 513 having conductive buttons 514 mounted thereon biased by the spring into electrical contact with the terminals of the radiant glass panel. Each of the springs is connected by a wire 515 to a suitable source of electrical power.

Power to the fuser is controlled by means of a conventional thermostat 531 inserted through suitable apertures in the top plate 522 and insulator 529 so that it rests in contact with the radiant glass panel of the radiant top panel. The thermostat 531 is held in position by leaf springs 532 secured to the top of the top panel.

The radiant top panel and the radiant bottom panel are secured at one end by their support members 526 and 506, respectively, to plate 11 and at their opposite ends by their retainer brackets 508 to plate 10. Plates 10 and 11 may be formed integrally with the main frame of the machine, as shown, or, optionally may be formed as separate plates bolted or otherwise secured to the main frame of the machine.

The top panel is mounted above the bottom panel at a distance therefrom sufficient to permit the paper grippers and the chains or endless belts of the sheet conveyor to travel in the space between the panels whereby a sheet of support material may be transported through the fuser.

To conserve heat within the fuser and to partly prevent heat transfer by convection from the heat fuser to the xerographic drum, the side opening of the fuser nearest to the xerographic drum is provided with a gate 541 to partly close the opening between the radiant top and botton panels when the fuser is being operated on a standby basis. When the xerographic apparatus is in operation, the gate is opened to permit a sheet of support material to be transported through the fuser by the sheet conveyor mechanism.

The gate 541 secured to a crank rod 542 is pivotally supported by the crank rod in clips 543 secured to the side wall 523 of the top plate nearest the xerographic drum. Stated in other words, the clips are mounted to the front side wall as determined by the direction of travel of the chains of the sheet conveyor. Openings 544 are provided in the gate for the passage of the endless belts or chains of the sheet conveyor.

In normal operation the gate is opened by means of a solenoid SOL–1 mounted on bracket 545 secured to the outboard face of plate 11. A lever 546 guided in the bifurcated turned-up portion of the bracket is connected at one end by pin 547 to the normally extended plunger of the solenoid, and at its other end to the crank rod 542 to actuate the gate. When the solenoid SOL–1 is actuated, its plunger is retracted to actuate the crank rod to rotate the gate inward toward the radiant glass panel of the radiant top panel, this movement being in the direction of travel of the sheet conveyor. A solenoid having a normally extended plunger is used in the preferred embodiment of the apparatus, so that if the solenoid fails to operate, the gate can still be opened by contact of a paper gripper 44 of the sheet conveyor mechanism 43 striking the gate and forcing it open as the sheet gripper travels through the fuser.

In the embodiment shown, plate 10 is provided with an aperture through which the radiant top and bottom panels may be inserted into the machine. To eliminate heat loss from this end of the fuser a closure plate 551 and insulator pad 552 are secured to the radiant top panel and the radiant bottom panel.

The radiant glass panels are suitably connected to an electrical circuit, in parallel with each other but in series with the thermostat to permit it to control the amount of electrical energy supplied to both radiant glass panels.

*Plate cleaning assembly*

To remove any residual powder that may remain on the xerographic plate after the transfer process, there is provided a plate cleaning assembly, and to dissipate any residual electric charge remaining on the plate a light source is used to flood the portions of the xerographic plate with light as it passes through the cleaning station.

Although any suitable cleaning mechanism may be used to remove powder particles remaining on the drum after the transfer process, the cleaning apparatus used in the preferred embodiment of the xerographic reproducing apparatus shown is a web cleaning apparatus of the type disclosed in copending Roger H. Eichorn application, Serial No. 77,922, filed concurrently herewith on December 23, 1960, to permit the web cleaner unit to be removed so that an operator may change web material conveniently and without undue shut-down time of the machine.

As shown, the web cleaner 54 includes a right-hand side plate 401 and a left-hand side plate 402 held in rigid spaced-apart parallel relationship by means of a spacer or guide plate 58 which also acts as a guide for the web as described hereinafter. A web of material, such as paper tissue 55, used to clean the drum, carried preferably by a cardboard cylinder 403 on supply roll 56, is fed around cleaner or pressure roll 57 into contact with the drum and then the web of material, dirty side up, travels over the backside of the spacer to a second cardboard cylinder 403 mounted on a driven take-up or rewind roll 61.

The cleaner or pressure roll 57, preferably made of rubber, is bonded to shaft SH–16, journaled by bearings 411 mounted in the side plates, and driven by gear 404 fixedly attached by pin 405 to the shaft outboard of the right-hand side plate, suitable washers 406 and 407 centering the cleaner roll with respect to the side plates.

The supply roll 56 and the take-up roll 61, formed as hollow cylinders for the purpose described hereinafter, are removably journaled in bearings 408 and 409, respectively, mounted on the side plates as shown.

Both side plates have slots 412 formed therein over which the bearings 408 and 409 are centered. The portions of the bearings 408 in which the ends of the paper supply roll are journaled have slots 413 formed therein, while the bearings 409 have slots 414 formed therein extending the full length of the bearing, the aforementioned slots in the bearings corresponding in shape to the slots 412 formed in the side plates so that the supply and take-up roll may be removed from the web cleaner for the removal and/or replacement of the web material thereon.

Right-hand roll lock 415 and left-hand roll lock 416 are slidably mounted on the right-hand side plate and the left-hand side plate, 401 and 402, respectively, by means of pivot studs 417 secured to the side plates. The roll locks are biased into frictional contact with their respective side plates by means of springs 418 secured to the pivot studs. The roll locks are formed with depending lock porions 419 that engage the rolls when in their lowered position to lock the rolls in their respective bearings.

Both the supply roll and the take-up roll are each provided with a pin 438 adapted to engage the cardboard cylinders bearings the web material whereby the cardboard cylinders will rotate with the respective rolls upon which they are mounted.

A dowel 421 is secured to the plates 11 and 12 so that it extends outward from plate 11 toward plate 10 but terminating just short of the latter plate to support the web cleaner in the xerographic apparatus while still permitting it to be removed therefrom, and to guide the web cleaner as it is removed from the xerographic apparatus or inserted into the xerographic apparatus. The dowel 421 is adapted to slidably and pivotally receive bearing 408 on the right-hand side plate, the dowel extending into the paper supply roll 56 but out of contact therewith when the web cleaner is positioned to abut the spacer 422 secured by retaining ring 423 on the dowel adjacent to plate 11.

The web cleaner when mounted on the dowel, as described, is free to be rotated about the dowel so that the cleaner roll 57 can be biased into operative position against the peripheral surface of the xerographic drum with a web material sandwiched therebetween, or it can be rotated so that the cleaner roll is moved away from the peripheral surface of the drum so that during removal it will not scratch the drum surface.

The cleaner roll of the web cleaner is cammed into operative position by means of a cam 424 coacting with the cam plate 420 secured to the left-hand side plate. The cam 424 is secured to the axle 425 rotatably mounted in left-hand side plate 10 and the axle is provided with a square end extending from the plate to receive a conventional wrench or other tool for manipulation by an operator. To rotate the web cleaner out of operative position a handle 426 is secured to the left-hand side plate for manual manipulation by an operator.

When the web cleaner is cammed into operative position, the gear 404 on shaft SH–16 is driven by gear 427 on the drum drive shaft SH–1 through a gear train consisting of gears 428 and 429 rotatably mounted on shaft SH–13, gears 431 and 432 rotatably mounted on shaft SH–14, and gears 433 and 434 rotatably mounted on shaft SH–15, each of the aforementioned shafts being mounted on plate 11.

A rewind shaft 435 slidably mounted within the rewind rollers by means of outboard bushing 436 and inboard bushing 437 secured in the ends of the rewind roller, is coupled by means of the pin 438 to the rewind roller for rotation therewith, the pin extending through an elongated opening 439 in the rewind shaft to permit relative axial movement of the rewind shaft with respect to the rewind roller. The rewind shaft has a bifurcated end adapted to engage a drive pin 441 secured in the hollow end of shaft SH–17. Shaft SH–17, journaled in plates 11 and 12, is driven by belt 442 connecting it to pulley 443 secured between gears 433 and 434 on shaft SH–15, tension on the belt being maintained by idler 444 rotatably mounted on shaft SH–18 and biased against the belt by spring 456 connected at one end to the idler and at its other end to stud 457 in plate 11.

The rewind shaft is normally biased into driven engagement with the pin on shaft SH–17 by means of spring 445 encircling the rewind shaft between the outbard bushing 436 and the spring stop 446 secured thereon by dowel pin 447. To permit rotation of the web cleaner away from the drum so that it can be pulled out to clear the end of shaft SH–17. The rewind shaft is maintained in this inoperative position against the biasing force of spring 445 by latch 448 adapted to engage the undercut portion of the rewind shaft. The latch is pivotably secured to the left-hand slide plate by means of a latch stud 451.

*Machine operation*

The xerographic drum 20, copy drum 22 and sheet conveyor 43 are driven by a main drive motor M–3, as previously described. The conveyor and the toner dispenser are suitably driven by a motor MOT–4, not shown except schematically in FIG. 27. Suitable blowers, not shown, driven by motors M–2 and M–1 are used to dissipate heat generated by the fuser and projection lamps from the machine.

The cleaner roll 57 of the web cleaner is driven off the drum shaft SH–1 through a suitable gear train consisting of gear 427 fixed on shaft SH–1, gears 428 and 429 fixed on shaft SH–13, gears 431 and 432 fixed on shaft SH–14, gears 433 and 434 fixed on shaft SH–15, and gear 404 fixed on shaft SH–16, which supports the web cleaner roll 57. The rewind roll 61, supported on shaft SH–7, is driven by belt 442 riding on shaft SH–17 and on pulley 443 secured to shaft SH–15. Tension is maintained on the belt 442 so that it slips slightly on the shaft SH–17, by means of an idler 444 rotatably mounted on shaft SH–18. Each of the above-described shafts are suitably journaled in frame plate 11.

In the average office it is generally necessary to make, at random intervals throughout the day, a single reproduction from a single copy, multiple reproductions from a single copy or single reproductions from successive copies. For this reason, it is desirable to maintain the reproducing cycle in a standby operative condition with the reproduction cycle initiated only as desired.

Figure 22:
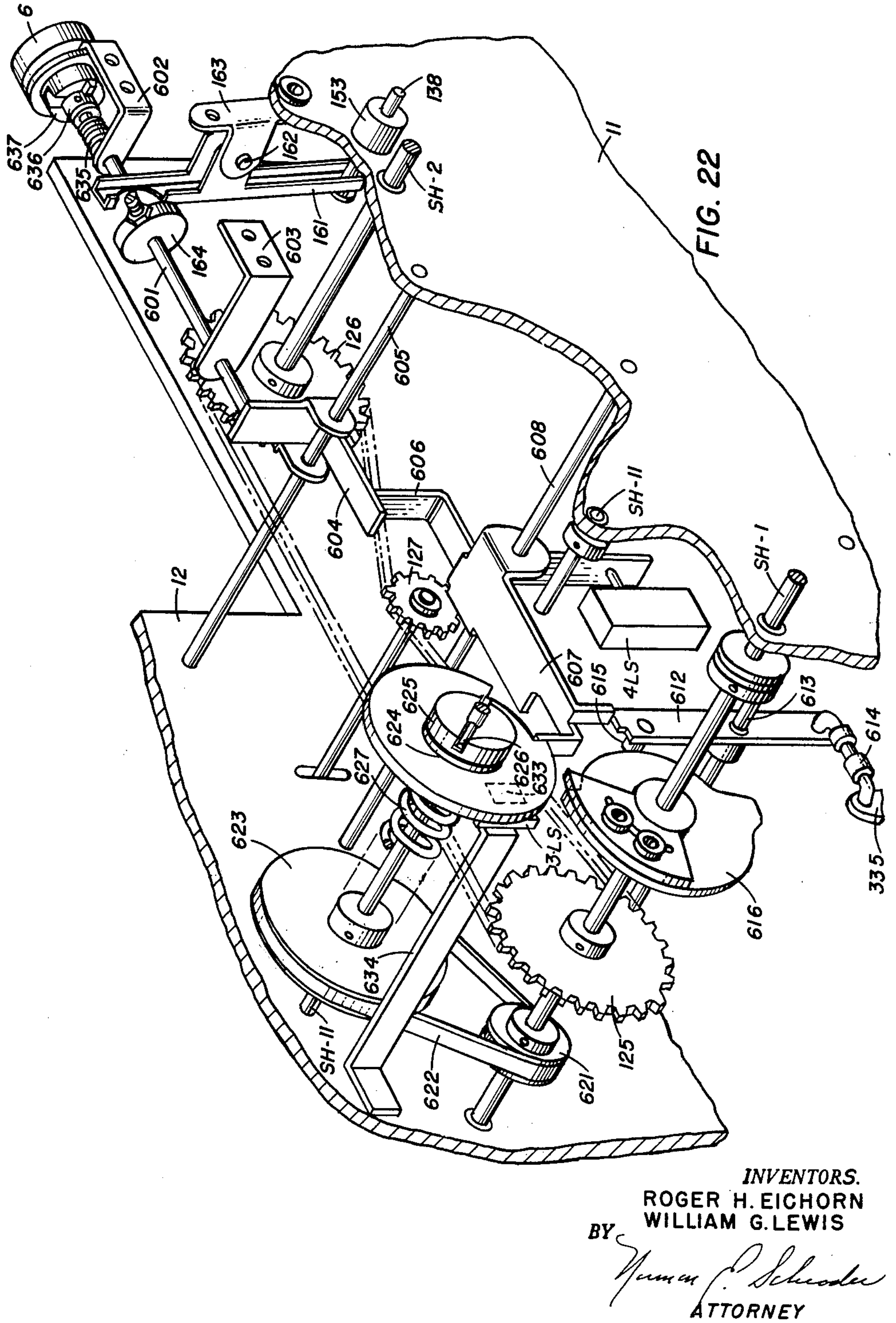
FIG. 22 is an exploded perspective view of the mechanical control mechanism of the apparatus.

In the preferred embodiment of the invention, the control of the apparatus is affected by means of an electromechanical control apparatus, by means of which the operator can effect the desired sequence of operation. A control knob 6 secured to the control shaft 601 slidably supported in brackets 602 and 603 secured to frame plate 11 is used to control the operation of the machine. As an operator pushes the control knob and therefore the control shaft 601 attached thereto, a control lever 604 rotatably mounted on rod 605, fixed to frame plates 11 and 12, is pivoted in a counterclockwise direction, as seen in FIG. 22 to depress actuator 606 secured to a latch 607 rotatably mounted on latch rod 608 secured to frame plates 11 and 12. Latch 607 has an upturned finger portion engageable with time delay cam 611 and a depending finger portion engageable with the step portion cam lever 612 rotatably supported on rod 613 also secured to frame plates 11 and 12. The cam lever is secured at one end by means of a ball joint 614 to the torque tube lever 335 for actuation of the paper feed mechanism as previously described. Mounted near the opposite ends of the cam lever from the ball joint is a cam follower 615 suitably secured to the cam lever which is adapted to ride on the paper feed cam 616 fixed on drum shaft SH–1. The drum shaft SH–1, previously described, is held in axial alignment by means of a collar 617 secured to the shaft and riding against a thrust bearing 618 positioned adjacent to the flanged bearing 75 on frame plate 11, and by means of pulley 621, secured to the sprocket 125 fixed on the shaft, abutting against the flanged bearing 75 in frame plate 12. Shaft SH–1 is operatively connected to shaft SH–11 to drive this shaft by means of belt 622 riding on pulleys 621 and 623 fixedly mounted on shafts SH–1 and SH–11, respectively.

The time delay cam 611 is mounted on shaft 11 for either rotational or axial movement thereon, and is in effect part of a slip clutch arrangement by means of which the timing sequence of the apparatus may be controlled. The time delay cam 611 is provided on one face thereof with a cork clutch face 624 suitably secured thereon and positioned to engage the clutch element 625 suitably connected to shaft SH–11 by pin 626 for rotation therewith. The coil spring 627 encircling shaft SH–11, with one end of the spring abutting against pulley 623 and its other end abutting a spring seat 631 separated from the time delay cam 611 by means of bearing 632, is used to bias the time delay cam into frictional driven contact with the clutch element 625. It is realized that the force of the coil spring 627 should be sufficient to permit driving contact between the clutch face and the time delay cam but light enough to permit relative rotational movement between these two elements.

On the other face of the time delay cam 611 there is provided a cam riser 633 positioned to contact a normally closed limit switch 3LS mounted on bracket 634 secured to frame plate 12. As described in detail hereinafter limit switch 3LS and normally open limit switch 4LS suitably secured to frame plate 11 for actuation by the depending leg of latch 607 are used to control the operation of the machine.

Figures 23, 24, 25, 26:
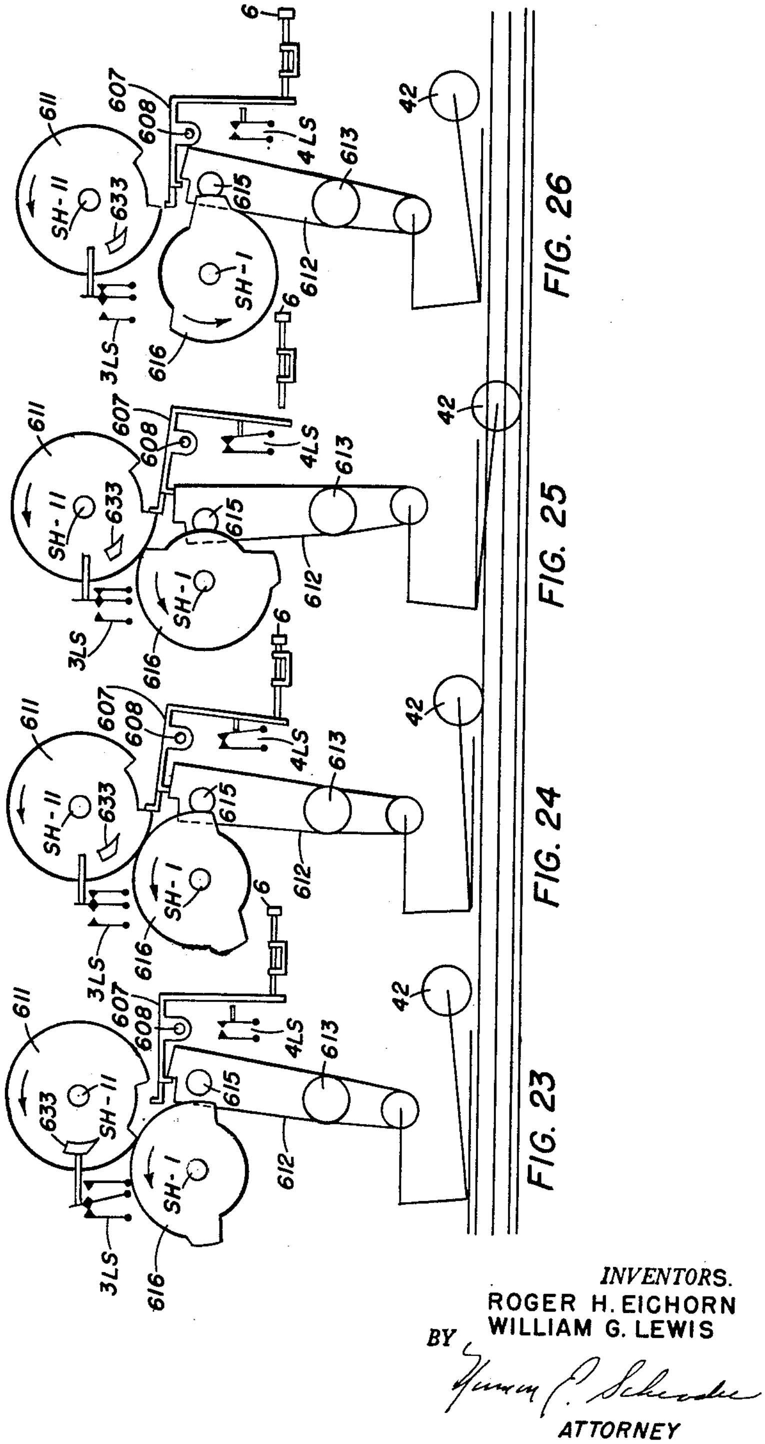

FIG. 23 illustrates the relative position of time delay cam 611, and paper feed cam 616, at rest in position to initiate a reproducing cycle. The cam lever is disengaged from the paper feed cam and is held in this position by the depending portion of latch 607, engaging the stepped portion of the cam lever. The cam lever in this position holds the separating roll 42 off the stack of support material in the paper tray.

As the operator pushes or depresses the control knob 6 to initiate a reproducing cycle, the latch 607 is moved by actuator lever 604 and control shaft 601, to release the cam lever 612 to let the cam follower 615 thereon to ride against the paper control cam 616 and in this position the cam lever will permit the separator roller 42 to drop into a standby position to feed a sheet of paper from the paper tray. The cam lever is thus moved to the position shown in FIG. 24 as it is released by the latch 607 by the weight of the separator roller 42, and arms 322 and other associated elements of the paper feed system.

At the same time, the depending leg of the latch 607 is moved to actuate the limit switch 4LS and the upturned portion of the latch is moved up into the recessed portion of the time delay cam in position to accept this cam as it is rotated. In this angular position of the time delay cam the cam riser 633 thereon is positioned to actuate the limit switch 3LS whereby its normally closed contact 3LSB is open and its contact 3LSA is closed.

With the cam lever thus moved into the position shown in FIG. 24 the latch will remain in position to close the contact of limit switch 4LS, and its upturned portion is in position to stop the rotational movement of the time delay cam. When this occurs, the operator is free to release the control knob 6, which is then biased outward by spring 635 encircling the control shaft 601. One end of the spring 635 abuts against a leg of the U-shaped bracket 602 and its other end abuts against a control detent 636 fixed to the control shaft. The control detent is adapted to mate with suitable notches provided in the detent control seat 637 secured to the other leg of the bracket 602. However, when it is desired to maintain the control knob depressed for a purpose described hereinafter, the control knob when it is depressed is rotated by the operator to thereby rotate the control detent 636 out of mating relation with the control detent seat 637.

As the limit switch 4LS is actuated to close its contact, a circuit is completed to the main drive motor MOT–3 thereby energizing this motor to effect rotation of the time delay cam 611 and the paper feed cam 616. As the time delay cam 611 is rotated the latch 607 becomes engaged with it to stop its rotation movement, this being made possible through the clutch mechanism previously described. As the time delay cam 611 is rotated to the position shown in FIG. 24, its cam riser 633 rides off the actuator of the limit switch 3LS to open its contact 3LSA and to close its contact 3LSB operating in parallel with limit switch 4LS as described in detail hereinafter.

In the meantime, the paper feed cam 616 continues to rotate and as the fall of this cam communicates its movement to the cam follower 615 on cam lever 612, the cam lever will be rotated sufficiently to drop the separator roll 42 onto the top sheet of the stack of support material. At the same time, the separator roll 42 is rapidly rotated by means of the segmental index lock 337 and actuating gear 336, through the drive system previously described, to feed the topmost sheet of support material into the guide 39 to be advanced to the sheet conveyor mechanism.

Further rotation of the paper feed cam 616 will bring the rise of this cam into contact with the follower 615 to actuate the cam lever 612 to lift the separator roll 42 from the stack through the mechanism previously described and at the same time it allows the latch to fall out of engaging relation with the time delay cam and to release limit switch 4LS to thereby permit its contact to open. Time delay cam 611 is now free to be rotated by the clutch mechanism and it will continue to rotate until the cam riser 633 thereon is again in position to again actuate limit switch 3LS to open is contact 3LSB to deenergize the circuit to the main drive motor.

This sequence of operation is for a single copy; however, the operator can effect repetitive cycles of the sequence of operation by merely depressing the control knob and rotating it to lift the control detent out of the control detent seat to thereby retain the latch in the position shown in FIG. 24 to maintain the contact of limit switch 4LS closed and to prevent the time delay cam 611 from rotating to effect a shutdown of the machine.

If the operator desires to make successive reproductions from successive originals, the operator as he dedepresses the control knob 6, will rotate it counterclockwise as seen in FIG. 9 to thereby permit the interposer to remain in position to effect operation of the gripper fingers 132 on the copy drum 22, whereby a copy may be accepted by the copy drum and ejected by the copy drum once every cycle of rotation of the copy drum in the manner previously described. However, if the operator wishes to make multiple reproductions of a single copy the control knob is turned clockwise as seen in FIG. 9 to thereby oscillate the actuator lever 161 about the axis of pin 162 by means of the cam 164 on the control shaft 601 to withdraw the interposer shaft out of interference relation with the lever 137A on the rock shaft 133 of the copy drum.

A clearer understanding of this operation and the general operation of the apparatus can best be obtained by reference to the schematic wiring diagram and by reference back to the sequence of operation diagram, FIGS. 23 to 26, inclusive, just described.

Before the xerographic apparatus may be actuated the removable sides of the cabinet must be placed in position to actuate the interlock switches 1LS and 2LS mounted on the cabinet frame, not shown. These interlock switches are used so that the machine may be operated only when the removable side of the cabinet are in position. This provision is made, not only from the standpoint of safety, but also to insure proper air circulation within the cabinet to dissipate heat generated by the projection lamps and the heat fuser.

The entire assembly of the apparatus is energized by closure of switch SW–1 connecting the assembly through the interlock switches ILS and 2LS to a suitable source of power, such as a commercial 120 volts 60 cycle alternating current outlet. With the closure of switch SW–1, a standby lamp LMP–1 is energized through resistor R–3, and the motor M–2 of one of the blowers is energized to dissipate heat generated by the fuser. The resistance heater elements R–1 and R–2 of the heat fuser 46 are energized through the normally closed thermostat THS–1. The machine is not operated for a short period of time to permit the heat fuser to come up to its normal operating temperature.

At the start of the sequence of operation as shown in FIG. 23 the time daly cam is in position whereat its cam riser 633 actuates limit switch 3LS to open its normally closed contact 3LSB and to close its contact 3LSA to thereby energize the blower motor M–1. These elements will remain energized and the machine will remain in this standby condition until either switch SW–1 is opened or until the machine is actuated to perform a reproducing cycle.

To make a reproduction, a copy is inserted into the machine over guide or document shelf 2 and through guide 31 into contact with the copy drum 22. The copy is advanced through guide 31 until its forward progress is stopped by the document stops 101 and in this position the document is maintained against the peripheral surface of the copy drum by retaining clips 109 whereby the operator can release the copy. The operator then depresses the control knob 6, and rotates it if desired to make either successive or multiple copies. As the control is depressed the latch 607 is moved to actuate limit switch 4LS to thereby close its contact to complete a circuit to the remaining electrical elements of the machine. That is, at this time the main drive motor M–3 is energized to rotate the xerographic drum 20, the copy drum 22 and the sheet conveyor mechanism 43, and to effect operation of the time delay cam 611 and the paper feed cam 616 through the mechanism previously described. Motor M–4 is also energized to effect operation of the developer mechanism 35 and toner dispenser 37. Solenoid SOL–1 is energized to open the gate 65 of the heat fuser 46. At the exposure station the exposure lamps are energized; that is, fluorescent lamps LMP–2 and LMP–3 are energized through their conventional starting circuits, consisting of ballast L–1 and L–2 and starter S–1 and S–2, respectively. Lamps LMP–4 and LMP–5 connected in series with each other are energized through the conductor line connected to the secondary of transformer T–1 also energized at this time. The discharge lamp LMP–6, a fluorescent lamp, is energized through its circuit consisting of ballast L–3 and starter switch S–3. Power is also supplied to the high voltage power supply PS–1 to effect operation of the corona charging device 21, the corona transfer device 45 and the corona precleaning device 51.

As previously described, the latch 607 will remain in position to close the contact of limit switch 4LS for a period of time during the sequence of operation of the machine to enable the time delay cam to rotate sufficiently to release the limit switch 3LS whereby its contact 3LSA is opened and its normally closed contact 3LSB is opened and its normally closed contact 3LSB is again closed. Thus, when limit switch 4LS is opened by the release of latch 607, as shown in FIG. 26, the machine remains energized through the normally closed contact 3LSB of limit switch 3LS.

Now as the xerographic drum 20 rotates under corona charging device 21 a uniform electrostatic charge is deposited on the photoconductive layer of the drum. As the xerographic drum rotates through the exposure station, a light or radiation pattern of the copy carried on the rotating copy drum 22 is projected, by means of the mirror and lens assembly previously described, onto the surface of the drum to dissipate the charge on the drum in accordance with the light or radiation pattern of the copy, thereby forming a latent electrostatic image of the copy on said xerographic drum. The exposed portion of the drum then rotates to the developing station C, where a xerographic developing material including toner particles having an electrostatic charge are cascaded over the drum surface whereby the toner particles adhere to the electrostatic latent image to form a xerographic powder image in the configuration of the copy. The exposed and developed portion of the xerographic drum then passes to the image transfer station D where it receives a sheet of support material advanced by the separator roll 42 and transported into contact with the drum by the sheet conveyor. As the drum and sheet of support material pass over the corona transfer device 45 the developed powder image is transferred electrostatically to the sheet of support material. The xerographic drum then continues to rotate past the pre-cleaning corona device 51 and then to the web cleaning device whereat any residual powder on the drum surface is removed by the web, and then under the discharge lamp whereat any residual charge on the drum is dissipated by radiation from this lamp.

In the meantime the copy drum has rotated at a corresponding rate of speed whereby it may have rejected any copy, if the interposer is in position to cause the ejection of copy, and the copy drum is then ready to receive a second copy, or if the copy is to be retained on the copy drum it is ready to be advanced through the exposure station again. Assuming that only a single reproduction of a single copy is being made, the copy will have been ejected from the machine and the xerographic powder image will have been transferred to the sheet of support material during the one cycle of rotation of the xerographic drum and copy drum. However, at this point in the operation of the apparatus, the sheet of support material with the powder image transferred thereto has not been ejected from the machine.

The operating cycle of the apparatus disclosed is such that it requires three cycles of rotation of the xerographic drum and the copy drum to effect one and one-half cycles of rotation of the sheet conveyor mechanism. In the embodiment of the apparatus shown, the pitch length of the chain of the sheet conveyor is twice the circumference of the xerographic drum, so for three revolutions of the xerographic drum the chain makes one and one-half revolutions. Thus, after the transfer step, even though a second reproduction is not to be made, the xerographic drum and the copy drum must rotate through a second and third revolution to permit the sheet conveyor mechanism to eject a sheet of support material from the machine. However, during the second and third revolution of the xerographic drum and the copy drum, still assuming that only a single reproduction is being made, the optical system will in effect scan a blank copy drum and project radiation from the copy drum onto the xerographic drum, to expose the xerographic drum to this blank image. The xerographic drum will then again pass through the developing station and through the transfer station as previously described; however, the latch 607, as seen in FIG. 26, has now engaged the cam lever 612 to prevent the advancement of a sheet of transfer material from the paper tray to the xerographic drum. As the xerographic drum continues to rotate through the second and third cycle it will again be cleaned as it passes through the cleaning station E and thus made ready for an actual reproducing cycle.

The continued operation of the sheet conveyor and therefore of necessity of the copy drum and xerographic drum, is effected by means of the time delay cam 611 which operates in time sequence to the rotation of the xerographic drum as driven by the chain conveyor mechanism so that sufficient time is allowed before the main drive motor is de-energized by opening of contact 3LSB to enable the sheet conveyor mechanism and the delivery rollers to eject the reproduction from the machine. The time delay cam completes one revolution, at half the speed of rotation of the xerographic drum, to bring its cam riser 633 into contact with the limit switch 3LS to open its normally closed contact 3LSB and to close contact 3LSA. As contact 3LSB is opened the developer motor MOT–4 is de-energized, and the main drive motor M–3 is de-energized to effect stoppage of the xerographic drum, the copy drum and the sheet conveyor mechanism. At the same time, solenoid SOL–1 is de-energized to allow the gate on the heat fuser to close and the document lamps LMP–2, LMP–3, LMP–4 and LMP–5 are de-energized as is the discharge lamp LMP–6. Simultaneously with the stoppage of the xerographic drum, the high voltage power supply 1 is de-energized thereby de-energizing the corona charging device 21, the corona transfer device 45 and the corona pre-cleaning device 51. The machine is once again in its standby condition, and a xerographic reproducing cycle can be initiated in the manner previously described, or the machine can be shut down by opening switch SW–1.

In making successive reproduction or multiple reproductions, a xerographic reproducing cycle is effected for each revolution of the xerographic drum except for the last reproduction to be made, at which time the machine effects one complete operating cycle, that is, three cycles of the xerographic drum and copy drum to one and one-half of the conveyor mechanism, exactly as described hereinabove for a single reproduction. In other words, in making successive or multiple reproductions, as the last reproduction is to be made, the operator will rotate control knob 6 into the single copy position, that is, where control detent 636 is in position to mate with detent control seat 637 at which time the operation of the machine is set for a single reproducing cycle.

While the invention has been described with reference to the structures disclosed herein it is not confined to the details set forth and this application is intended to cover such modifications or changes as may come within the purposes of the improvements or the scope of the following claims.

What is claimed is:

1. A xerographic reproducting apparatus including in combination
a frame,
a xerographic drum journaled for rotation in said frame,
charging means positioned to place an electrostatic charge on said xerographic drum,
a copy drum journaled for rotation in said frame,
a sheet gripper means carried by said copy drum, said sheet gripper means being adapted to cooperate with said copy drum to engage the leading edge of a copy to be reproduced,
a projection mechanism positioned adjacent said copy drum to project a radiation image of a copy as it is carried by said copy drum onto said xerographic drum to form an electrostatic latent image thereon,
an interposer means positioned adjacent said copy drum for movement into a first position to effect operation of said sheet gripper means and to a second position in which it is in an inoperative relation to said sheet gripper means,
developer means positioned adjacent said xerographic drum to develop the electrostatic latent image formed on said xerographic drum,
paper feed means for seriatim feeding of sheet support material to said xerographic drum,
transfer means positioned adjacent said xerographic drum to effect transfer of the developed image on said xerographic drum to a sheet of support material,
drive means connected to said xerographic drum, said copy drum, and said paper feed means to effect synchronized movement of said xerographic drum, said copy drum and said paper feed means, said xerographic drum being rotated at least one revolution to first effect a reproducing cycle and then rotated at least a second revolution to effect a timing out cycle, and,
control means connected to said interposer means, and to said paper feed means to effect the operation of said paper feed means only during said reproducing cycle of said xerographic drum and to move said interposer means.

2. A xerographic reproducing apparatus including in combination
a frame,
a xerographic drum journaled for rotation in said frame,
charging means positioned to place a uniform electrostatic charge on said xerographic drum,
a copy drum journaled for rotation in said frame,
a sheet gripper means carried by said copy drum, said sheet gripper means being adapted to cooperate with said copy drum to engage the leading edge of a copy to be reproduced,
a projection mechanism positioned adjacent said copy drum to project a radiation image from a copy carried by said copy drum onto said xerographic drum to form an electrostatic latent image thereon,
an interposer means positioned adjacent said copy drum for movement into a first position to effect operation of said sheet gripper means and to a second position in which it is in an inoperative relation to said sheet gripper means,
developer means positioned adjacent said xerographic drum to develop the electrostatic latent image formed on said xerographic drum,
sheet separator and advancing means for seriatim feeding of sheet support material,
sheet conveyor means for forwarding sheet support material, received from said sheet separator and advancing means, to said xerographic drum,
transfer means positioned adjacent said xerographic drum to effect transfer of the developed image on said xerographic drum to a sheet of support material,
drive means connected to said xerographic drum, said copy drum, and said sheet conveyor means to effect synchronized movement of said xerographic drum, said copy drum and said sheet conveyor means, said drive means being operatively connectable to said sheet separator and advancing means, and
control means connected to said interposer means and to said sheet separator and advancing means to effect the operation of said sheet separator and advancing means by said drive means and to move said interposer means.

3. A xerographic reproducing apparatus including in combination
a frame,
a xerographic drum journaled for rotation in said frame,
charging means positioned to place an electrostatic charge on said xerographic drum,
a copy drum journaled for rotation in said frame with the axis of said copy drum parallel to the axis of said xerographic drum,
a sheet gripper means carried by said copy drum, said sheet gripper means being adapted to cooperate with said copy drum to engage the leading edge of a copy to be reproduced,
a projection mechanism positioned to project a radiation image from a copy carried by said copy drum onto said xerographic drum,
an interposer means positioned adjacent said copy drum for movement into a first position to effect operation of said sheet gripper means and to a second position in which it is in an inoperative relation to said sheet gripper means,
a paper supply tray for a stack of sheet support material,
sheet separator means for seriatim feeding of sheets from said paper supply tray,
sheet conveyor means for forwarding sheet support material from said sheet separator means to said xerographic drum,
developer means positioned adjacent said xerographic drum to develop the electrostatic latent image formed on said xerographic drum,
transfer means positioned adjacent said xerographic drum to effect transfer of the developed image on said xerographic drum to a sheet of support material,
drive means connected to said xerographic drum, said copy drum, and said sheet conveyor means to effect synchronized movement of said xerographic drum, said copy drum and said sheet conveyor means, said drive means being operatively connectable to said sheet separator means, and
control means connected to said interposer means and to said sheet separator means to effect the operation of said paper feed means by said drive means in timed relation to the scanning of a copy carried by said copy drum and to move said interposer means to effect the transporting of a copy by said copy drum.

4. A xerographic reproducing apparatus including in combination
a frame,
a xerographic drum journaled for rotation in said frame,
charging means positioned to place an electrostatic charge on said xerographic drum,
an endless conveyor journaled for rotation in said frame,
a sheet gripper means, carried by said endless conveyor, to engage the leading edge of a copy to be reproduced,
a projection mechanism positioned adjacent said endless conveyor to project a radiation image of a copy as it is carried by said sheet gripper onto said xerographic drum to form an electrostatic latent image thereon,
an interposer means positioned adjacent said endless conveyor for movement into a first position to effect operation of said sheet gripper means and to a second position in which it is in an inoperative relation to said sheet gripper means,
developer means positioned adjacent said xerographic drum to develop an electrostatic latent image formed on said xerographic drum, paper feed means positioned for seriatim feeding of sheet support material to said xerographic drum, transfer means positioned to effect transfer of the developed image on said xerographic drum to a sheet of support material, drive means connected to said xerographic drum, and to said endless conveyor to effect synchronized movement of said xerographic drum, and said endless conveyor, driven means connected to said paper feed means and operatively connected to said drive means to effect the operation of said paper feed means and control means connected to said interposer means to move said interposer means and connected to said driven means to effect operation of said paper feed means.

5. A xerographic reproducing apparatus including in combination, a frame, an endless xerographic plate journaled for rotation in said frame, charging means positioned to place an electrostatic charge on said xerographic plate, an endless conveyor journaled for rotation in said frame, a sheet gripper means carried by said endless conveyor, to engage the leading edge of a copy to be reproduced, a projection mechanism positioned adjacent said copy drum to project a radiation image of a copy as it is carried by said sheet gripper on said endless conveyor onto said xerographic drum to form an electrostatic latent image thereon, an interposer means positioned adjacent said endless conveyor for movement into a first position to effect operation of said sheet gripper means and to second position in which it is in an inoperative relation to said sheet gripper means, developer means positioned adjacent said endless xerographic plate to develop the electrostatic latent image formed on said endless xerographic plate, paper feed means for seriatim feeding of sheet support material to said xerographic drum, transfer means to effect transfer of the developed image on said endless xerographic plate to a sheet of support material, drive means connected to said endless xerographic plate, and to said endless conveyor, to effect synchronized movement of said xerographic plate and said endless conveyor, driven means connected to said paper feed means to operate said paper feed means in timed relation to the scanning of a copy carried by said sheet gripper, and control means connected to said interposer means to effect the release of a copy from said sheet gripper and connected to said driven means to effect operation of said paper feed means.

6. A xerographic reproducing apparatus including in combination a frame, a xerographic drum journaled for rotation in said frame, charging means positioned to place a uniform electrostatic charge on said xerographic drum, a copy drum journaled for rotation in said frame, a sheet gripper means carried by said copy drum, said sheet gripper means being adapted to cooperate with said copy drum to engage the leading edge of a copy to be reproduced, a projection mechanism positioned adjacent said copy drum to project a radiation image from a copy carried by said copy drum onto said xerographic drum to form an electrostatic latent image thereon, an interposer means positioned adjacent said copy drum for movement into a first position to effect operation of said sheet gripper means and to a second position in which it is in an inoperative relation to said sheet gripper means, developer means positioned adjacent said xerographic drum to develop the electrostatic latent image formed on said xerographic drum, sheet separator and advancing means for seriatim feeding of sheet support material, sheet conveyor means for forwarding sheet support material received from said sheet separator and advancing means to said xerographic drum, transfer means positioned adjacent said xerographic drum to effect transfer of the developed image on said xerographic drum to a sheet of support material, drive means connected to said xerographic drum, said copy drum, and said sheet conveyor means to effect synchronized movement of said xerographic drum, said copy drum and said sheet conveyor means, said drive means being operatively connectable to said sheet separator and advancing means, and control means connected to said interposer means and to said paper separator means to effect the operation of said paper separator and advancing means by said drive means in timed relation to the scanning of a copy carried by said copy drum and to control the operation of said interposer means to regulate the transporting of copy to be scanned on said copy drum.

7. A xerographic reproducing apparatus including in combination a frame, a xerographic plate journaled for rotation in said frame, charging means positioned to place an electrostatic charge on said xerographic plate, an endless conveyor having a sheet gripper journaled for rotation in said frame, said sheet gripper being adapted to engage the leading edge of a copy to be reproduced, a projection mechanism positioned to project a radiation image from a copy carried by said sheet gripper onto said xerographic plate, an interposer means positioned adjacent said endless conveyor for movement into a first position to effect operation of said sheet gripper means and to a second position in which it is in an inoperative relation to said sheet gripper means, a paper supply tray for a stack of sheet support material, a sheet separator means for seriatim feeding of sheets from said paper supply tray, sheet conveyor means for forwarding sheet support material from said sheet separator means to said xerographic plate, developer means positioned adjacent said xerographic drum to develop the electrostatic latent image formed on said xerographic plate, transfer means positioned adjacent said xerographic drum to effect transfer of the developed image on said xerographic plate to a sheet of support material, drive means connected to said xerographic plate, said endless conveyor, and said sheet conveyor means to effect synchronized movement of said xerographic plate, said endless conveyor and said sheet conveyor means, said xerographic drum being rotated at least one revolution to first affect a reproducing cycle and then rotated at least a second revolution to effect a timing out cycle, and control means connected to said interposer means and to said sheet separator means to effect the operation of said paper feed means in timed relation to the scanning of a copy carried by said copy drum during said reproducing cycle and to move said interposer means to effect the transporting of a copy by said endless conveyor.

(References on following page)

References Cited by the Examiner

UNITED STATES PATENTS

| | | | |
|---|---|---|---|
| 2,220,526 | 11/40 | Kluitmann | 95—77.5 |
| 2,235,844 | 3/41 | Nelson | 271—41 |
| 2,357,674 | 9/44 | McConnell | 88—24 |
| 2,371,925 | 3/45 | Schade | 95—77.5 |
| 2,461,185 | 2/49 | Schubert | 88—24 |
| 2,823,579 | 2/58 | Fitter | 88—24 |
| 2,889,758 | 6/59 | Bolton | 95—1.7 |
| 2,903,546 | 9/59 | O'Mara | 219—19 |
| 2,918,853 | 12/59 | Oldenboom | 95—1.7 |
| 2,959,095 | 11/60 | Magnusson | 95—1.7 |
| 2,961,932 | 11/60 | Francis | 95—1.7 |
| 2,965,756 | 12/60 | Vyverberg | 95—1.7 |

NORTON ANSHER, *Primary Examiner.*
JOHN M. HORAN, EMIL G. ANDERSON, *Examiners.*